(12) United States Patent
Tsiberidis

(10) Patent No.: US 11,364,739 B2
(45) Date of Patent: Jun. 21, 2022

(54) VEHICLE WHEEL

(71) Applicant: GV ENGINEERING GMBH, Heimsheim (DE)

(72) Inventor: Konstantin Tsiberidis, Untergruppenbach (DE)

(73) Assignee: GV ENGINEERING GMBH, Heimsheim (DE)

( * ) Notice: Subject to any disclaimer, the term of this patent is extended or adjusted under 35 U.S.C. 154(b) by 345 days.

(21) Appl. No.: 16/468,755

(22) PCT Filed: Dec. 13, 2017

(86) PCT No.: PCT/EP2017/082675
§ 371 (c)(1),
(2) Date: Jun. 12, 2019

(87) PCT Pub. No.: WO2018/109032
PCT Pub. Date: Jun. 21, 2018

(65) Prior Publication Data
US 2020/0223248 A1    Jul. 16, 2020

(30) Foreign Application Priority Data

Dec. 13, 2016 (DE) .......................... 102016124121.0

(51) Int. Cl.
*B60B 7/04* (2006.01)
*B60B 7/00* (2006.01)
*B60B 7/06* (2006.01)

(52) U.S. Cl.
CPC .............. *B60B 7/0086* (2013.01); *B60B 7/04* (2013.01); *B60B 7/06* (2013.01); *B60B 2900/211* (2013.01); *B60B 2900/513* (2013.01)

(58) Field of Classification Search
CPC ......... B60B 15/263; B60B 7/008; B60B 7/04; B60B 7/0086; B60B 7/06; B60B 2900/513; B60B 2900/211
See application file for complete search history.

(56) References Cited

U.S. PATENT DOCUMENTS 2,506,677 A * 5/1950 McKenna ............... B60C 23/16
  152/422
9,388,867 B2 * 7/2016 Hummel ............. F16D 65/0031
(Continued)

FOREIGN PATENT DOCUMENTS

DE    102011010509 A1    8/2012
DE    102016003963 A1    9/2016
(Continued)

OTHER PUBLICATIONS

International Search Report from PCT/EP2017/082675, dated Jun. 8, 2018 (9 pages).

*Primary Examiner* — Scott A Browne
(74) *Attorney, Agent, or Firm* — Ware, Fressola, Maguire & Barber LLP

(57) ABSTRACT

The invention relates to a vehicle wheel comprising a wheel rim (12) that has a hub portion (38), a rim base (36) for receiving a tire, a plurality of support portions (40) interposed between the hub portion (38) and the rim base (36), at least one interspace (42) between the support portions (40), and at least one cover element (44) associated with the interspace (42), characterized in that the cover element (44) can be transferred from a first position to a second position by pneumatic actuation.

23 Claims, 52 Drawing Sheets

(56) References Cited

U.S. PATENT DOCUMENTS

| | | | | |
|---|---|---|---|---|
| 2008/0001467 A1* | 1/2008 | Gilly | ................. | B60B 7/20 |
| | | | | 301/37.25 |
| 2009/0195053 A1* | 8/2009 | Kruse | ................. | B60B 19/10 |
| | | | | 301/6.4 |
| 2013/0313889 A1* | 11/2013 | Schmid | ................. | F16D 65/847 |
| | | | | 301/37.107 |
| 2015/0003569 A1* | 1/2015 | Ji | ................. | H04B 5/0037 |
| | | | | 375/340 |
| 2019/0322128 A1* | 10/2019 | Yen | ................. | B60B 7/0086 |
| 2021/0031559 A1* | 2/2021 | Tsiberidis | ................. | B60B 7/002 |

FOREIGN PATENT DOCUMENTS

| | | | | |
|---|---|---|---|---|
| EP | 3112205 A1 * | 1/2017 | ................. | B60T 5/00 |
| FR | 2886214 A1 * | 12/2006 | ................. | B60B 7/0086 |
| FR | 2886214 A1 | 12/2006 | | |
| WO | 2016005565 A2 | 1/2016 | | |

* cited by examiner

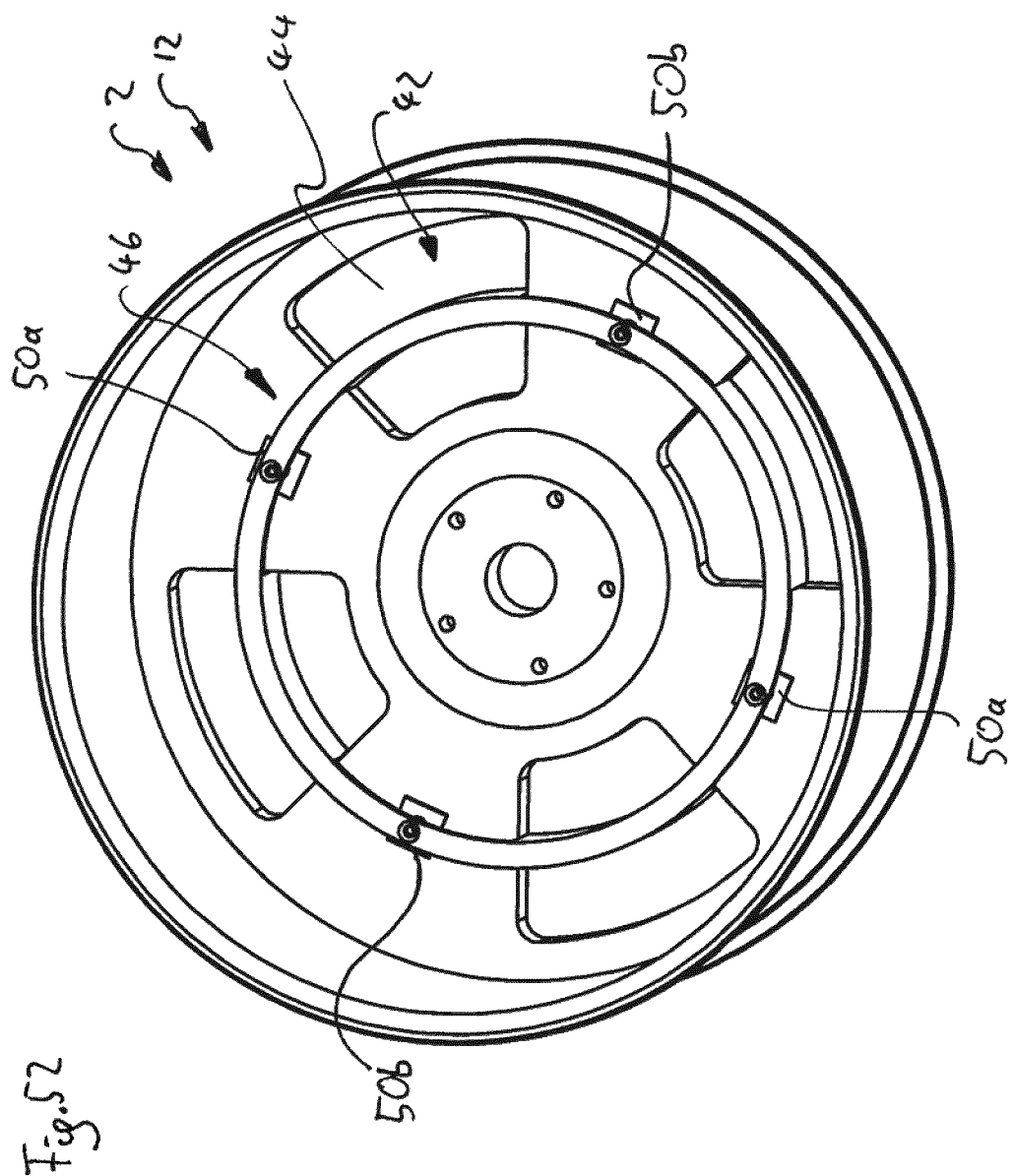

VEHICLE WHEEL

FIELD OF THE INVENTION

The invention relates to a vehicle wheel. That is to say, a vehicle wheel having a wheel rim which has a hub portion, a rim base for receiving a tire, a plurality of support portions arranged between the hub portion and the rim base, at least one interspace arranged between the support portions, and at least one cover element associated with the interspace.

BACKGROUND OF THE INVENTION

The design of modern wheel rims is subject to different, in some cases conflicting, requirements. On the one hand, the wheel rim is to have a rim contour which permits simple manufacture; on the other hand, it is a central requirement that the wheel rim permits as great an air flow as possible in order, when necessary, to allow a brake disc of a vehicle brake to be cooled optimally via the air stream.

Furthermore, when the temperature of the brake disc rises while the vehicle is stationary, it must be ensured that the heat can also be transported away without an air flow. This means that there is a resulting requirement for as "open" a rim structure as possible, that is to say that the interspaces account for as large a part of the rim as possible.

For aerodynamic reasons, however, the wheel rim is to be as closed as possible, in order to prevent as far as possible air turbulence caused by the interspaces, which are often also referred to as rim openings.

In normal driving operation, an excess pressure prevails in the region of the underbody of the vehicle, which ensures that air is pushed through the interspaces of the wheel rim. This results in high air turbulence. If the wheel rim were in the form of a closed disc, then the Cw value, which is a factor in determining the drag of the vehicle, could be improved.

In order to meet these requirements which, on the one hand for thermal reasons and on the other hand for aerodynamic reasons, are almost contradictory, it is known to be able to open and close the openings in the wheel rim as required by using movable cover elements.

There are known, for example, cover elements which open and close driven by centrifugal force. These cover elements thus open, for example, when a certain limit speed is exceeded, as a result of the centrifugal force acting on them.

However, such systems do not work reliably and also are only able to open or close the cover elements above a certain speed.

Accordingly, the object of the present invention is to provide a vehicle wheel which works reliably and meets the requirements both of aerodynamics and of cooling of the brakes.

SUMMARY OF THE INVENTION

That object is achieved according to the invention on the one hand by a vehicle wheel according to the present application. The vehicle wheel according to the invention is thus characterized in that the cover element can be transferred from a first position into a second position by pneumatic actuation.

It is advantageous if an actuating device for the pneumatic actuation of the cover element can be actuated by pressure medium from a tire cavity of the vehicle wheel. The tire cavity virtually represents a constantly present energy reservoir which can be used for actuating the cover elements.

Advantageously, a pressure medium channel extends from the tire cavity to the actuating device of the cover element. It is preferred if the pressure medium channel runs at least in part, preferably completely, in the material of the wheel rim, preferably, at least in part, in the material of one of the support portions. Such a connection is robust and space-saving and, moreover, the pressure medium channel can thus be of low-maintenance design.

It is additionally advantageous if the vehicle wheel comprises a compressor arrangement for providing pressurized pressure medium. This allows pressure medium, in particular compressed air, to be supplied to the tire cavity if required. Advantageously, the compressor arrangement does not operate continuously but either can be switched on when required or switches on automatically when required.

Within the meaning of the present invention it is also conceivable for the vehicle to which the vehicle wheel according to the invention is fitted to comprise a central compressed air generator which is connected to the individual vehicle wheels of the vehicle in such a manner that pressure medium, in particular compressed air, can be guided from the compressed air generator to the individual vehicle wheels. There can be used for this purpose, for example, rotary feedthroughs for the pressure medium. Such rotary feedthroughs are known from the prior art. The compressed air provided by the central compressed air generator can either be used directly for actuating the pneumatically actuatable cover elements, or the tire cavity can be supplied with compressed air if required.

It is advantageous if the compressor arrangement comprises at least one hub-side compression chamber. When the vehicle wheel rotates, the compression chamber thus rotates with it. It is then not necessary to provide rotary feedthroughs for supplying pressure medium to the tire cavity. Compression chamber thereby means any space in which a pressure medium can be pressurized.

In the context of the present invention, hub side and hub-side components are to be understood as meaning components that are arranged in a rotationally fixed manner relative to the wheel hub. Such components are thus connected directly or indirectly to the wheel hub in such a manner that, on rotation of the wheel hub relative to the wheel carrier, they rotate with the wheel hub. The wheel carrier is fixed to the vehicle. Wheel carrier side and wheel-carrier-side components are thus rotationally fixed relative to the wheel carrier. On rotation of the wheel or wheel hub, a rotational relative movement thus takes place between the wheel-carrier-side components, for example the passenger compartment of the vehicle, and the wheel or the tires, the wheel hub and the further hub-side components.

The wheel-carrier-side gear part is thus connected to the wheel-carrier-side components in a completely rotationally fixed manner in the state fitted to the vehicle. Thus, in driving operation of the vehicle, no part of the wheel-carrier-side gear part rotates. Only the hub-side components rotate about the axis of rotation.

It is advantageous if the compressor arrangement comprises a compressor component and the pressure medium can be pressurized by a movement, preferably a translational movement, of the compressor component. The compressor arrangement is thus able to operate particularly efficiently.

Particularly advantageous is a form of the compressor arrangement in which the compression chamber is in the form of a piston chamber and a piston is arranged in the piston chamber to be movable in an oscillating translational manner, wherein a pressure medium can be pressurized by the oscillating translational movement.

Advantageously, both the piston chamber and the piston are so formed and arranged that they co-rotate with the vehicle wheel when the vehicle wheel rotates, in other words that they are arranged on the hub side.

It is advantageous if the vehicle wheel can be mounted on a wheel carrier to be rotatable about an axis of rotation, and the compressor arrangement comprises a gear, preferably a cam gear, which is adapted, by cooperation of a wheel-carrier-side gear part with a hub-side gear part, to convert a rotational movement between the wheel carrier side and the wheel hub side into a preferably oscillating translational movement of the compressor component. The compressor arrangement can thus be operated particularly efficiently by utilizing the rotational relative movement between the wheel carrier side and the wheel hub side.

It is thereby advantageous in particular if the cooperation of the wheel-carrier-side gear part with the hub-side gear part is switchable. The compressor arrangement can virtually be switched on and off by switching the two gear parts. If the two gear parts are brought into cooperation, the compressor arrangement starts working. If the cooperation is interrupted, then the compressor arrangement stops working. Preferably, this switching ability is achieved via a coupling device of the compressor arrangement.

It is advantageous if the compressor arrangement is so configured that the compressor component is configured and arranged to perform an oscillating translational movement in the radial direction, wherein the oscillating translational movement takes place when the compressor arrangement is in operation. It is thus possible to pressurize a particularly large amount of pressure medium in a short time. It is thereby particularly preferred if the compression chamber is arranged radially outwards from the compressor component.

Alternatively, the compressor arrangement can be so configured that the compressor component is configured and arranged to perform an oscillating translational movement in the axial direction, that is to say the compressor component moves in the direction of the axis of rotation of the vehicle wheel when the compressor arrangement is in operation. The compressor arrangement can thus be of particularly compact and space-saving form. It is particularly preferred if the compressor component is in the form of an annular piston and the compression chamber is in the form of an annular piston chamber. A form of the compressor arrangement in the manner of a double piston pump is also advantageous. In this embodiment, the compressor component thus compresses pressure medium with its oscillating translational movement both on a forward movement and on a backward movement. For this purpose, at least two compression chambers arranged opposite one another with respect to the compressor component are provided in the compressor arrangement.

It is also advantageous if the compressor arrangement is electrically driven. The compressor arrangement can thus be flexibly arranged in the vehicle wheel. Preferably, however, the compressor arrangement, if it is electrically driven, is arranged in the region of the wheel hub receiver, preferably in the wheel hub receiver.

It is also advantageous if the vehicle wheel comprises an energy transmission device, preferably a contactless energy transmission device, via which electrical energy for is operating the compressor arrangement can be transmitted from a wheel-carrier-side energy source to the compressor arrangement. The central main battery of the vehicle, for example, can thus be used for operating the compressor arrangement.

It is also advantageous if the vehicle wheel comprises a hub-side energy source for providing electrical energy for operating the compressor arrangement. That is to say, if an energy source is provided which rotates with the vehicle wheel.

It is advantageous if the hub-side energy source comprises a generator by which the rotational movement between the wheel carrier side and the wheel hub side can be converted into electrical energy. Electrical energy can thus always be provided if required.

It is advantageous if the cover element covers the interspace further in the first position of the cover element than in the second position of the cover element. It is particularly preferred if the cover element completely covers or closes the interspace in the first position.

It is advantageous if the cover element is biased into one position, preferably the first position. Preferably, the cover element is thus biased into the position in which it covers the interspace further than in the second position. Preferably, the cover element is biased into a position in which it completely covers the interspace. If required, the cover element can then be pneumatically operated, whereby the interspace is freed or opened, whereby in turn the brake can be cooled if required. Alternatively, the cover element can also be biased into the second position, in which the interspace is thus not completely covered. If the cover element is biased in that manner, then the cover element is pneumatically operated and transferred into the first position, in which it covers the interspace further or advantageously completely, only when subjected to pressure.

It is advantageous if the cover element is movable between the first position and the second position by a rotational movement relative to the support portions. In particular when a plurality of cover elements and interspaces are present on the vehicle wheel, there can be provided in this embodiment a cover device which comprises a plurality of cover elements, whereby the cover elements can be moved together.

It is advantageous if the vehicle wheel comprises a plurality of cover elements which are connected together in such a manner that they are rotatable about the axis of rotation together.

In general, it is advantageous if the vehicle wheel according to the invention has a plurality of interspaces each with an associated cover element, wherein it is particularly preferred if the cover elements are coupled together in such a manner that they are pneumatically actuatable simultaneously. Alternatively, the individual cover elements can, however, also be pneumatically actuatable individually and independently of one another.

It is advantageous if the cover element is movable between the first position and the second position by a translational movement, preferably in the direction of the axis of rotation, relative to the support portions. The movement of the cover elements can thus be brought about pneumatically in a particularly simple manner.

It is advantageous if the cover element is movable between the first position and the second position by a tilting movement relative to the support portions. It is thus possible, inter alia, to implement a positioning of the cover elements in which they guide air to the brakes in the second position.

It is advantageous if the vehicle wheel has a plurality of interspaces, each of which has an associated cover element which can be transferred from a first position into a second position by pneumatic actuation.

It is advantageous if the vehicle wheel has a coupling device via which the cover element can be coupled with a brake of a vehicle on which the vehicle wheel is arranged, wherein the coupling device is configured to control an actuating device of the cover element in such a manner that the cover element is transferred from the first position into the second position in dependence on the operation of the brake and/or if a temperature threshold in the region of the brake is exceeded. The cover element can thus be actuated, or opened and closed, virtually on demand.

It is advantageous if the cover element can be transferred between the first position and the second position, preferably in a stepped manner, via intermediate positions.

It is advantageous if the cover element in the second position is so arranged relative to the support element that it guides air to the brake system during operation of the vehicle wheel by the rotation of the vehicle wheel.

It is advantageous if the vehicle wheel comprises a dust collecting device which is configured to collect dust particles from the air present in the interior of the wheel rim. If the cover element is closed, the brake dust that forms circulates in the region behind the wheel rim and can be collected via the dust collecting device. The emission of fine particles can thus be greatly reduced.

It is advantageous if the dust collecting device comprises an air filter and/or a magnetic dust collector. The fine dust, or brake dust, that forms can thus be filtered out particularly efficiently.

The invention also provides a vehicle having a vehicle wheel according to one or more of the embodiments described above, wherein the position of the cover element can be set by a control device, preferably in dependence on the speed of the vehicle.

However, the invention also provides a vehicle wheel according to one or more of the embodiments just described having a wheel rim which has a hub portion, a rim base for receiving a tire, a plurality of support portions arranged between the hub portion and the rim base, at least one interspace arranged between the support portions, and at least one cover element associated with the interspace, wherein the cover element can be transferred from the first position into the second position by electrical or magnetic actuation instead of by pneumatic actuation.

Advantageous forms and details of the compressor arrangement are described in detail hereinbelow.

Advantageously, the compressor arrangement is in such a form that it comprises a coupling device by means of which the hub-side gear part can be brought into cooperation with the wheel-carrier-side gear part. Operation of the compressor arrangement can thus be started or stopped according to the situation. It is thus possible to operate the compressor arrangement only when the pressure in the tire cavity to be filled falls below a desired pressure. The compressor arrangement can then be operated until the desired pressure is reached and can subsequently be switched off or disconnected.

It is particularly preferred if the coupling device of the compressor arrangement is pneumatically, magnetically, electrically or electromechanically actuatable, preferably comprises a hub-side coupling element which can be transferred, preferably pneumatically or electrically or electromechanically, from a blocking position into a release position, wherein the hub-side gear part cooperates with the wheel-carrier-side gear part when the coupling element is in the release position, and wherein the hub-side gear part is prevented from cooperating with the wheel-carrier-side gear part when the coupling element is in the blocking position. Cooperation between the hub-side and the wheel-carrier-side gear parts can thus be switched in an efficient manner via the coupling element.

It is particularly advantageous if the hub-side coupling element of the compressor arrangement is biased into the blocking position, in particular via a spring. In the basic state, cooperation of the hub-side and wheel-carrier-side gear parts is thus suppressed. Thus, no unnecessary energy is consumed in normal driving operation. Only if required, the hub-side gear part can be brought into cooperation with the wheel-carrier-side gear part via the coupling device or the coupling element.

It is advantageous if the hub-side gear part of the compressor arrangement is biased into a position in which it cooperates with the wheel-carrier-side gear part. A control pulse to the coupling device of the compressor arrangement is thus sufficient and the hub-side gear part comes into cooperation with the wheel-carrier-side gear part.

It is advantageous if the hub-side coupling element of the compressor arrangement is in such a form that, when it moves into the blocking position, it pushes the hub-side gear part into a position in which it is not in contact with the wheel-carrier-side gear part, independently of the position of the wheel-carrier-side gear part. Unnecessary wear of the hub-side gear part is thus prevented. Moreover, such a compressor arrangement is noiseless in the freewheel operating state, that is to say in the disengaged state, since no contact takes place between the hub-side gear part and the wheel-carrier-side gear part.

It is additionally within the meaning of the invention if the blocking portion of the hub-side coupling element gradually merges into a release portion of the hub-side coupling element, wherein the release portion, when seen in the direction of the translational movement of the compressor component, is arranged offset relative to the blocking portion. A smooth transfer of the coupling element from the release position into the blocking position is thus made possible. In particular the combination of this embodiment with the spring biasing of the coupling element provides particular advantages. If the coupling element is not brought into or held in the release position by the application of pressure via the pressure medium, then it automatically and smoothly slides into the blocking position. Such a gradual transfer between the positions leads to low-noise operation, or switching, of the compressor arrangement. Wear of the compressor arrangement can also be minimized as a result.

It is also advantageous if the coupling device of the compressor arrangement is actuatable via a pressure line by means of pressure medium from the tire cavity, in particular the coupling element of the compressor arrangement can be transferred from the blocking position into the release position by means of pressure medium from the tire cavity. Actuation of the coupling device by means of pressure medium from the tire cavity is an advantageous possibility for actuating the coupling device of the compressor arrangement because an external energy supply for the actuation is not necessary.

It is particularly advantageous if a coupling valve is provided fluidically between the coupling device of the compressor arrangement and the tire cavity, at which valve the pressure medium from the tire cavity is present and which opens if a tire pressure threshold value is not met, whereby the coupling device is actuated by means of pressure medium from the tire cavity and the hub-side gear part is brought into cooperation with the wheel-carrier-side gear part. It is thus possible, without an external power supply, to ensure that the tire cavity is provided with pressure medium and sufficient pressure since, as soon as the pressure in the tire cavity falls below a tire pressure threshold value, the tire is automatically supplied with further pressure medium. A separate control mechanism is thus superfluous. The compressor arrangement can work in an efficient, low-maintenance and reliable manner with an inexpensive construction.

It is also advantageous if the coupling valve is so configured that it closes when a tire pressure desired value, which is preferably above the tire pressure threshold value, is exceeded, whereby the application of pressure medium to the coupling device is interrupted, preferably wherein the coupling valve or a relief valve is so configured that air is removed from the coupling device when the tire pressure desired value is exceeded. Operation of the compressor arrangement is thus stopped virtually automatically and immediately when the tire pressure desired value is reached. The combination of this embodiment with an embodiment in which the hub-side gear part is biased into a position in which it cooperates with the wheel-carrier-side gear part offers particular advantages, since the compressor arrangement reacts particularly quickly to specific pressure values in the tire cavity being reached. In the last-described embodiment, it is thus always ensured that, when the coupling element moves into the release position, or generally when the hub-side gear part is released, that gear part moves into a position in which it cooperates with the wheel-carrier-side gear part. A certain emergency running property is thus also obtained to a certain degree by the use of the compressor arrangement according to the invention.

Preferably, a data exchange takes place between the controller of the cover elements, the brake of the vehicle and the pressure control of the tire cavity, wherein pressure control of the tire cavity is preferably achieved via the compressor arrangement described in this application.

Advantageously, the cover elements close automatically when the vehicle is stationary.

In an advantageous embodiment, the cover elements are self-cleaning, for example by a cleaning device which scrapes over the surface of the cover elements as the cover elements rotate.

In general, actuation of the cover elements can take place in an automated manner, that is to say on demand, or via a control signal given by a driver of the vehicle.

An advantage of driving with the cover elements closed is that the brake system of a vehicle having the vehicle wheel according to the invention is less contaminated and is also less exposed to liquids, for example rainwater. In particular, scoring is reduced on the brake discs of a vehicle that is equipped with the vehicle wheel according to the invention.

The actuating device of a vehicle wheel according to the invention can have two types of actuators. The actuators of the first type lead to opening of the cover elements when pressure medium is applied, and the actuators of the second type lead to closing of the cover elements when pressure medium is applied.

Such provision of actuators of different types can be combined with all the types of vehicle wheels described in this application. To that end, a central switching unit, for example, can apply pressure medium to different pressure medium lines depending on the type of actuator that is to be controlled, or subjected to pressure medium.

Further features, possible applications and advantages of the invention will become apparent from the following description of exemplary embodiments of the invention, which are explained with reference to the drawings, wherein the features can be fundamental to the invention both in isolation and in different combinations, without explicit reference being made thereto again. In the drawings:

BRIEF DESCRIPTION OF THE FIGURES

FIG. 52 shows a detailed representation of a pressure medium circuit.

DETAILED DESCRIPTION OF THE FIGURES

Figure 1:
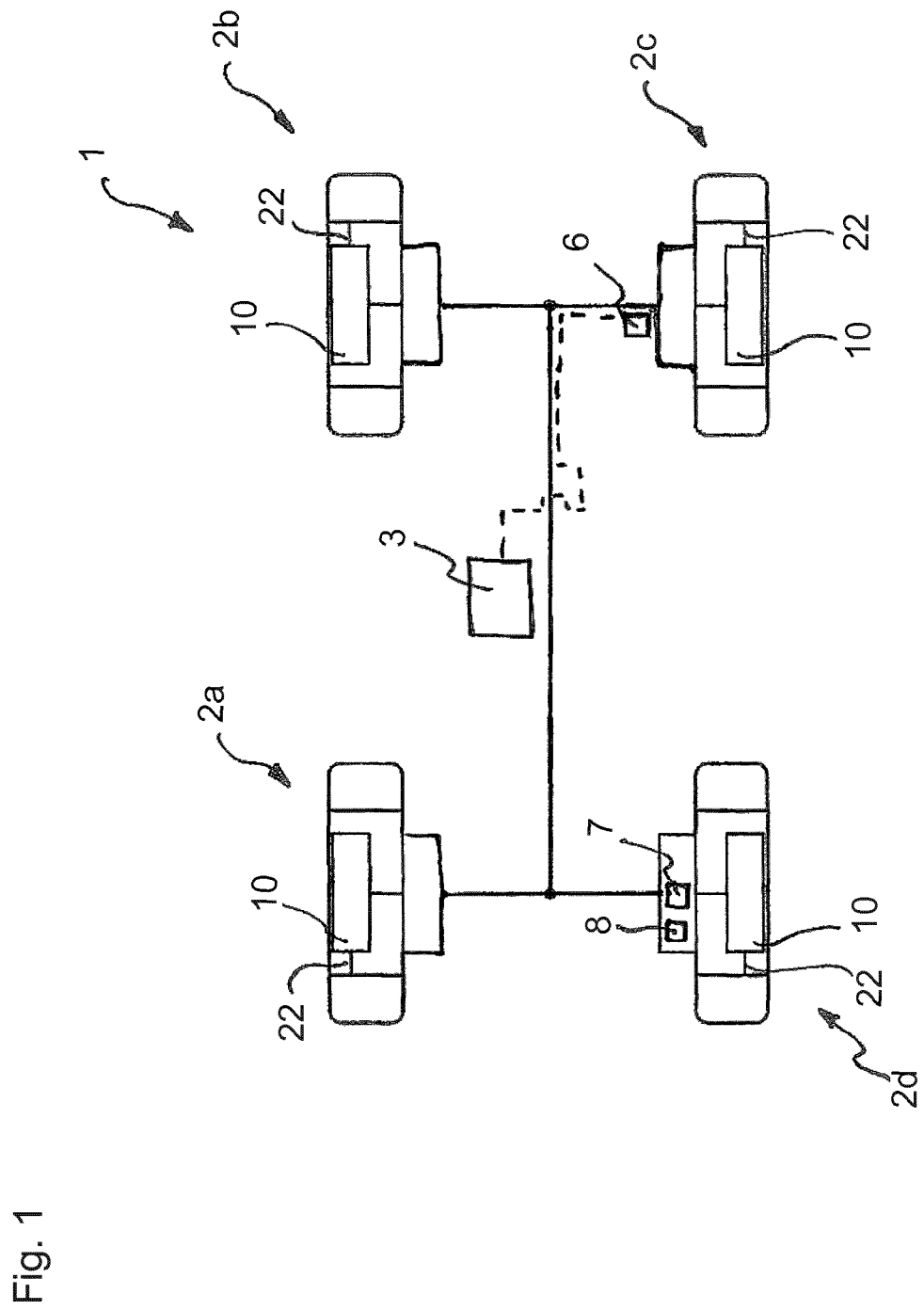
FIG. 1 is a schematic representation of a vehicle having four vehicle wheels according to the invention.

In the following figures, corresponding components and elements have the same reference numerals. For the sake of clarity, not all reference numerals are shown in all figures.

FIG. 1 shows, in schematic form, a vehicle 1 according to the invention. In the present case, the vehicle has four vehicle wheels 2, which are identified 2a-2d, the present invention not being limited to four-wheeled vehicles 1. The vehicle wheels 2 will be described in greater detail hereinbelow. Each of the vehicle wheels 2 has an associated compressor arrangement 10 shown schematically in FIG. 1.

In the case of a first vehicle wheel 2a, the compressor arrangement 10 is in the form of a mechanically driven compressor arrangement 10 with a radially movable compressor component.

In the case of a further vehicle wheel 2b, the compressor arrangement 10 is in the form of a mechanically driven compressor arrangement 10 with an axially movable compressor component.

In the case of a further vehicle wheel 2c, the compressor arrangement 10 is in the form of an electrically driven compressor arrangement 10. The electrical energy for operating the compressor arrangement 10 is transmitted from the wheel carrier side to the hub side by the main battery 3 of the vehicle via a preferably contactless, preferably inductive transmission device 6, shown symbolically. The transmission device 6 can also be formed by sliding contacts.

In the case of a further vehicle wheel 2d, electrical energy for operating the compressor arrangement 10 is provided directly on the hub side via an energy source. The energy source can be an energy store 7, for example an accumulator, or an energy producer 8, preferably a generator. The energy producer 8 utilizes the rotational relative movement between the wheel carrier side and the hub side to generate power. The combination of an energy store 7 with an energy producer 8 is also advantageous.

Figure 2:
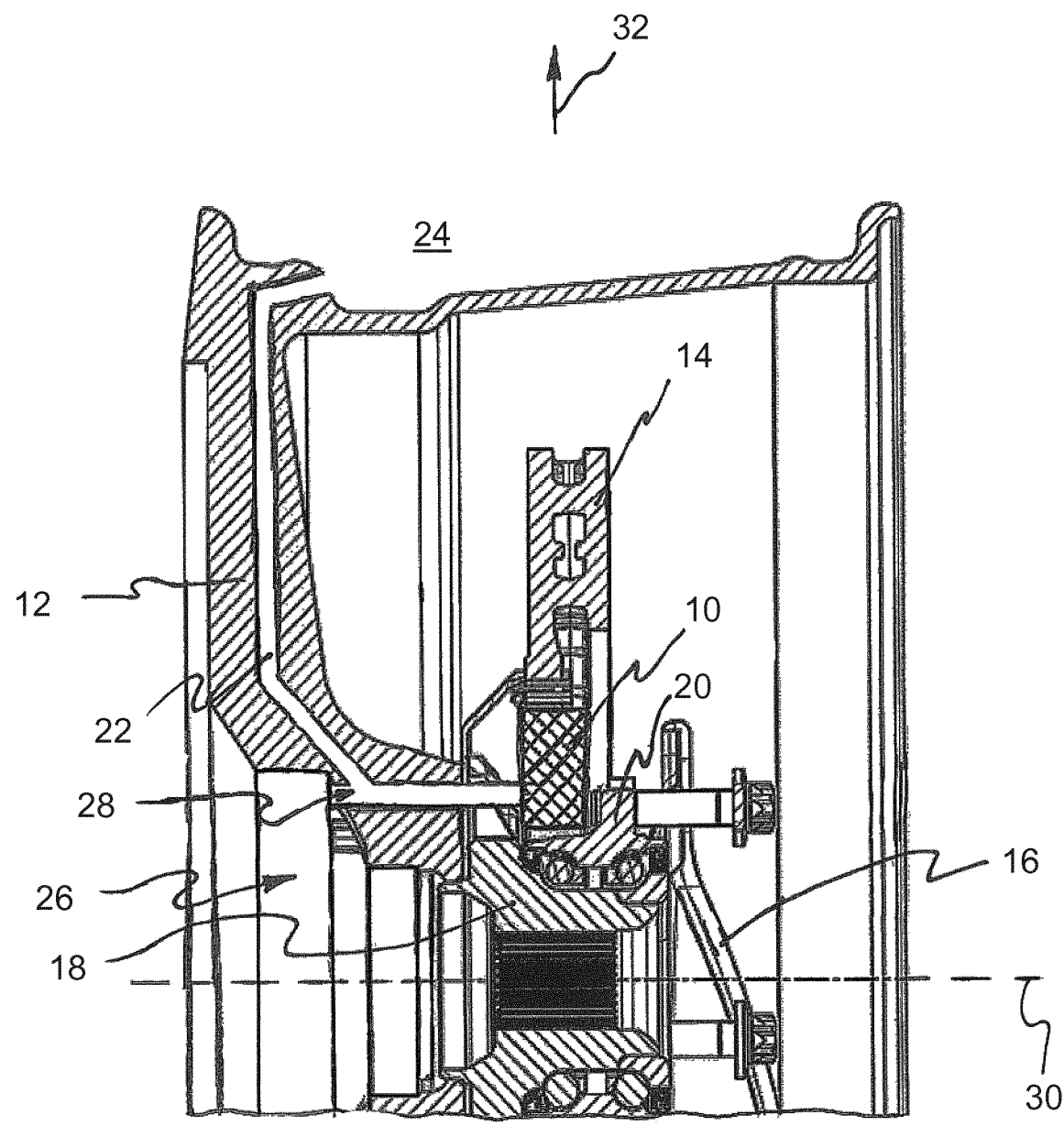
FIG. 2 shows an installation position of a compressor arrangements in detail.

FIG. 2 shows, schematically, the installation position of a mechanically driven compressor arrangement 10, as arranged in the above-mentioned wheels 2a and 2b. The compressor arrangement 10 itself is shown only schematically in FIG. 2 by a crosshatched area.

A wheel rim has the reference numeral 12. A brake disc 14, a wheel carrier 16, a wheel hub 18 and a wheel bearing 20 are likewise shown.

A first pressure medium line 22 extends from the compressor arrangement 10 to a tire cavity 24. The tire itself is not shown in FIG. 1. In the embodiment shown in FIG. 1, the first pressure medium line 22 extends through the material of the wheel rim 12.

In the region of a wheel hub receiver 26, the wheel rim 12 has a connection 28, shown schematically, for supplying a sealant. The connection 28 is optional.

An axis of rotation has the reference numeral 30 and a radial direction the reference numeral 32. During operation of the vehicle, the hub side, and thus the hub-side components, rotate(s) about the axis of rotation 30 relative to the wheel carrier side, that is to say relative to the wheel-carrier-side components, such as, for example, relative to the wheel carrier or also relative to the passenger compartment of the vehicle.

Figure 3:
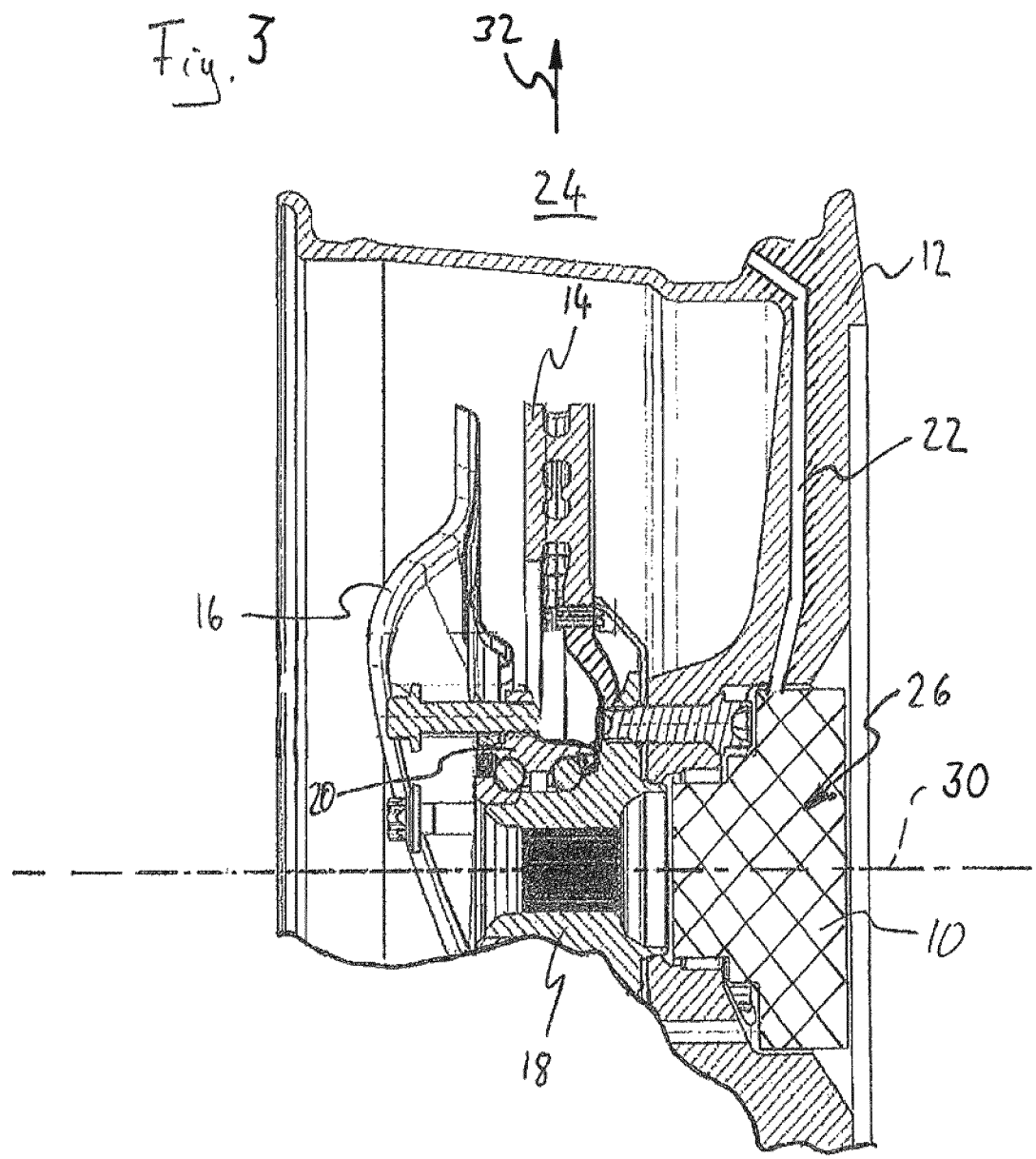
FIG. 3 shows an alternative installation position of the compressor arrangements in detail.

FIG. 3 shows the installation position of an electrically driven compressor arrangement 10, as arranged in the above-mentioned wheels 2c and 2d, in a representation similar to the representation of FIG. 2. The electrically driven compressor arrangement 10 is arranged in the region of the wheel hub receiver 26, preferably in the wheel hub receiver 26.

Figure 4:
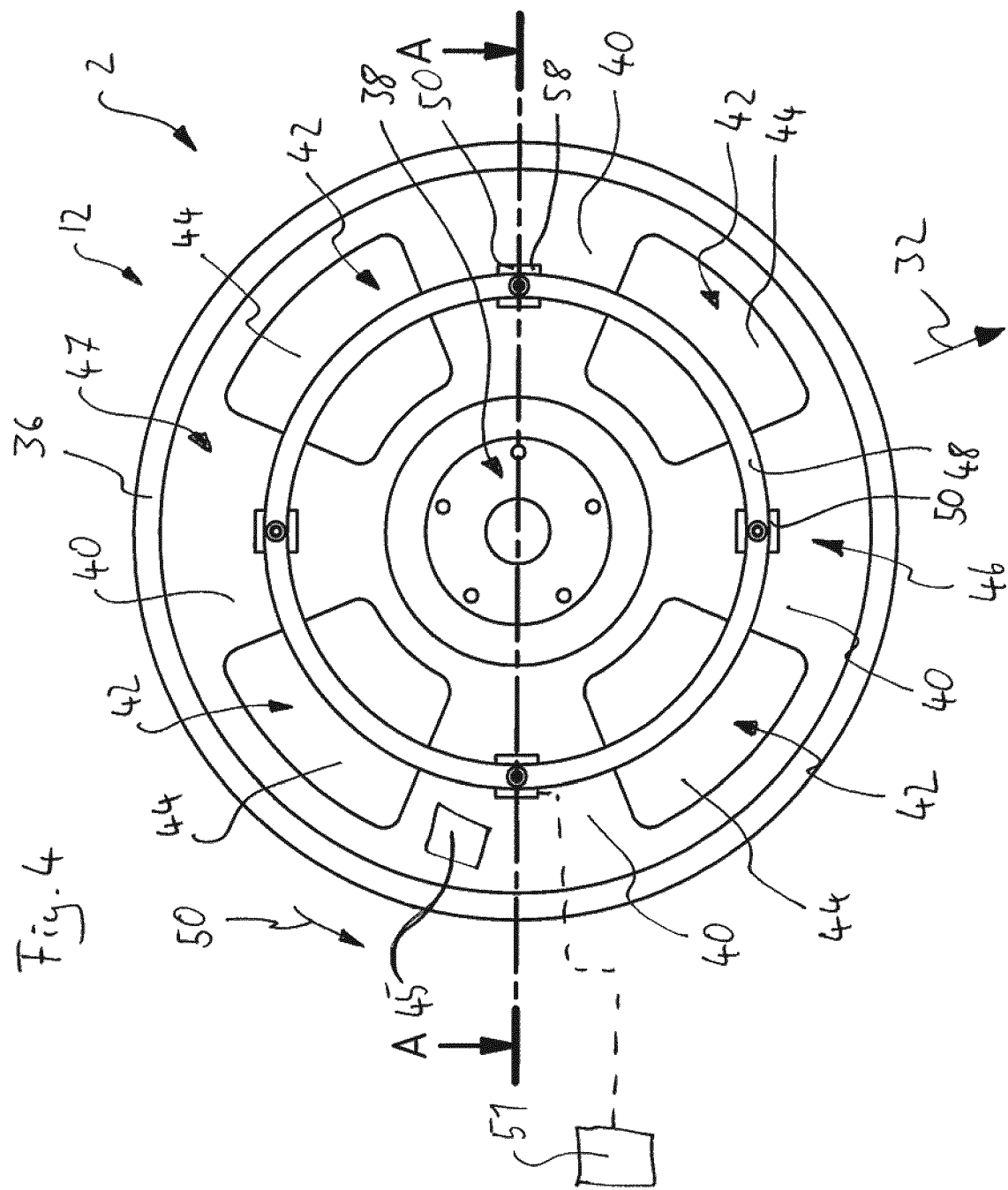
FIGS. 4 to 10 show a vehicle wheel according to the invention of a first embodiment.

FIG. 4 shows in detail a first embodiment of a vehicle wheel according to the invention in a side view as seen from the side of the wheel carrier. The wheel rim 12 of the vehicle wheel 2 is shown without the tire. The wheel rim 12 comprises a rim base 36 located radially on the outside and a hub portion 38 located radially on the inside.

A plurality of spoke-like support portions 40 extend in the radial direction. The spoke-like support portions 40 extend from the hub portion 38 to the rim base 36.

The support portions 40 are each spaced apart from one another via interspaces 42. Each interspace 42 has an associated cover element 44.

In the representation of FIG. 1, the cover elements 44 are shown in a first position. In the present case, the vehicle wheel is so configured that, in this first position, the cover elements 44 cover the interspaces 42 in such a manner that the interspaces 42 are completely closed. This complete covering is, however, not essential.

A dust collecting device 45, shown symbolically, is arranged in the interior of the wheel rim 12. The dust collecting device 45 can collect dust which is found in the air in the interior 47 of the wheel rim 12 magnetically or via an air filter.

The wheel rim comprises an actuating device 46. The actuating device 46 comprises an annular actuating element 48.

The annular actuating element 48 is connected to a plurality of actuators 50 distributed in a circumferential direction, which actuators likewise form part of the actuating device 46. The actuators 50 can be coupled with the brake of the vehicle 1 via a coupling device 51. The actuation of the actuators 50 can thus be coupled to the particular driving condition of the vehicle 1 or also to the operating state of the brake of the vehicle 1. Alternatively or in addition, the coupling device 51 can be capable of being coupled or connected to an operating unit for the driver of the vehicle 1.

Such a coupling device 51 can be combined with each of the embodiments of the vehicle wheel 2 described in this application, but is not essential. The actuators 50 are each connected via pressure medium lines 52 to the tire cavity 24.

Figure 7:
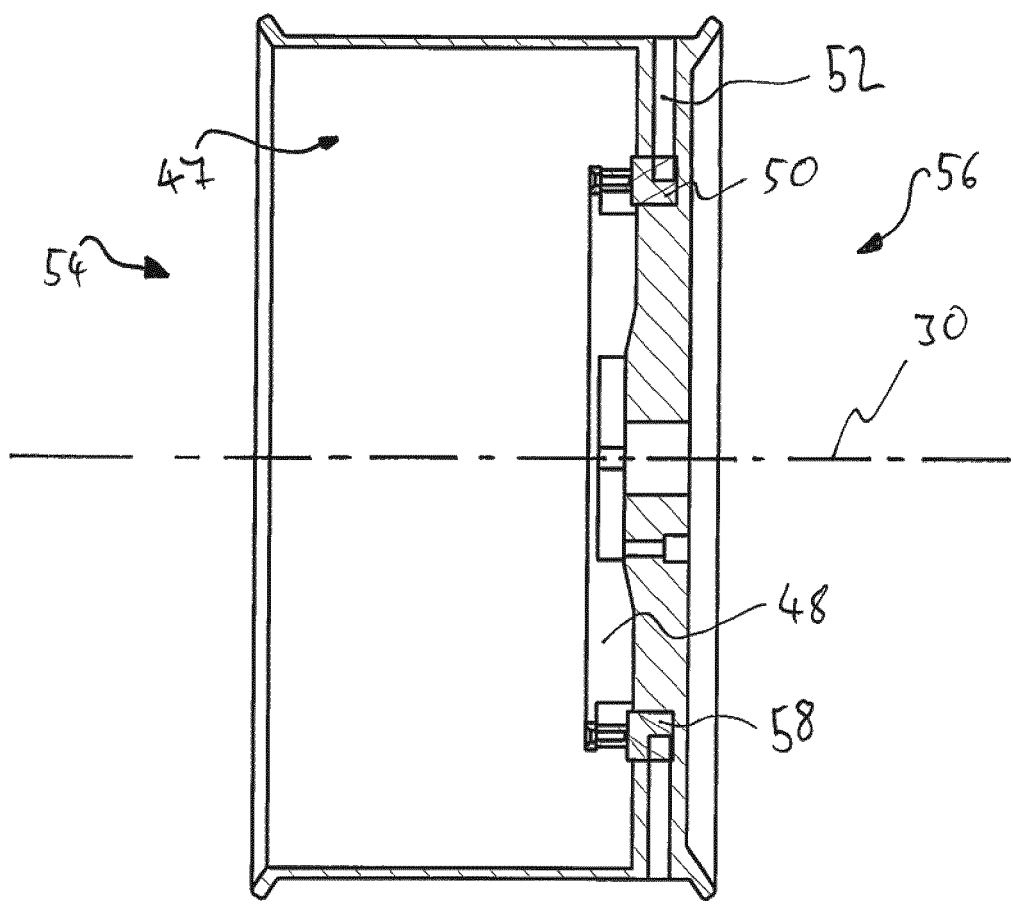
Figure 8:
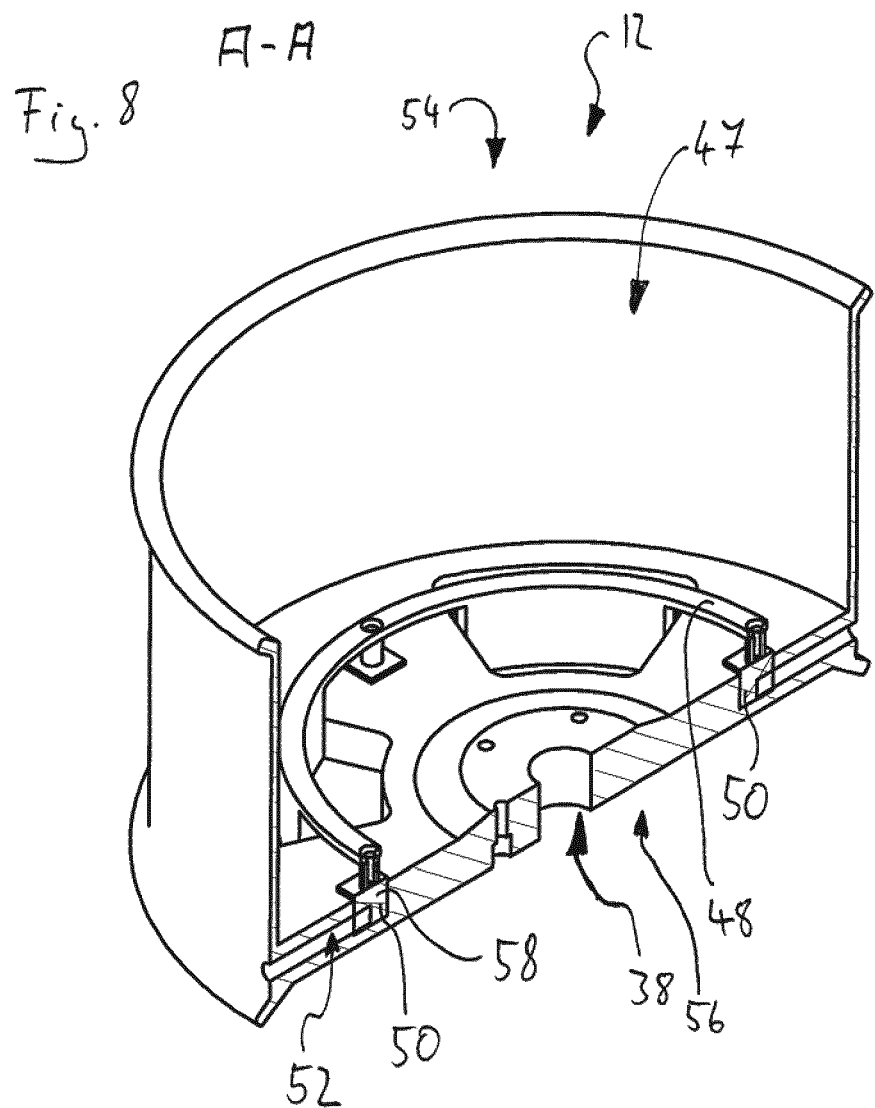
Figure 10:
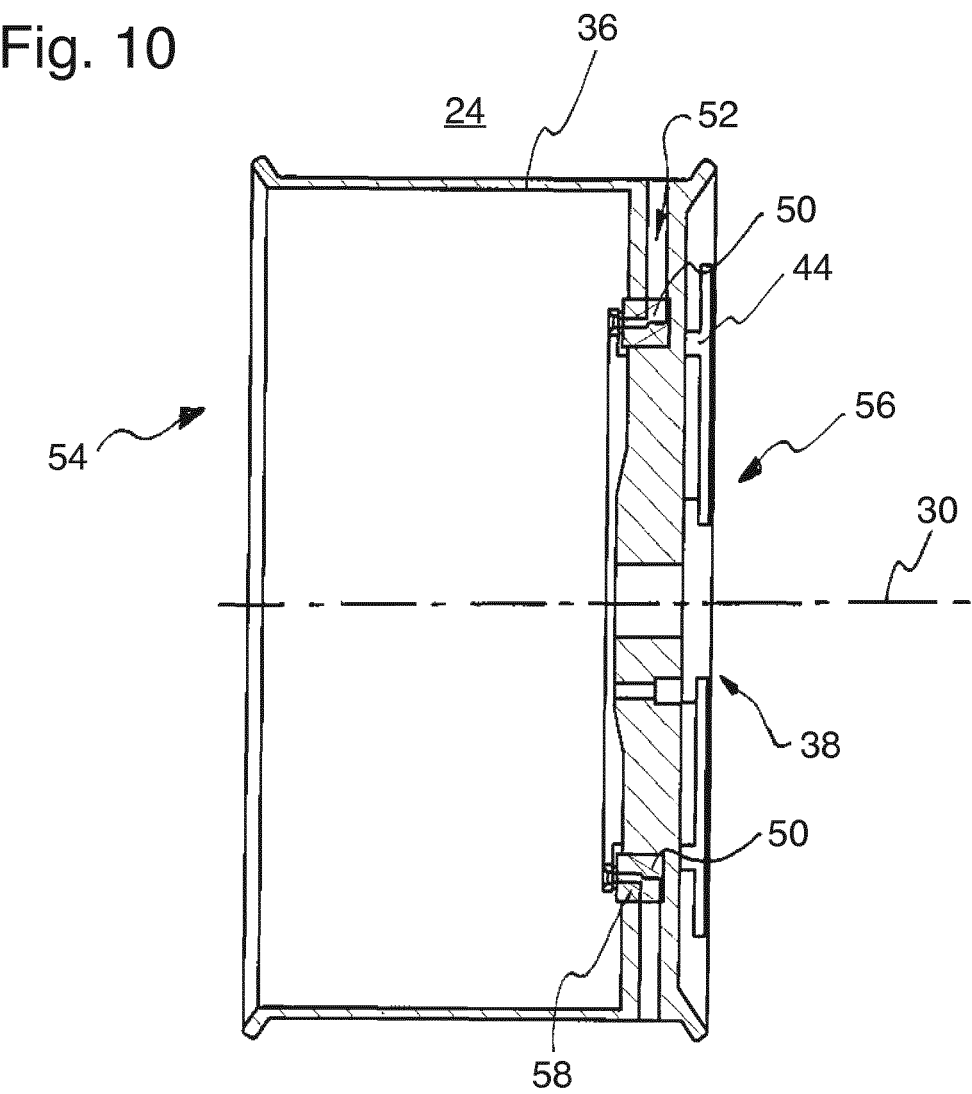
Figure 11:
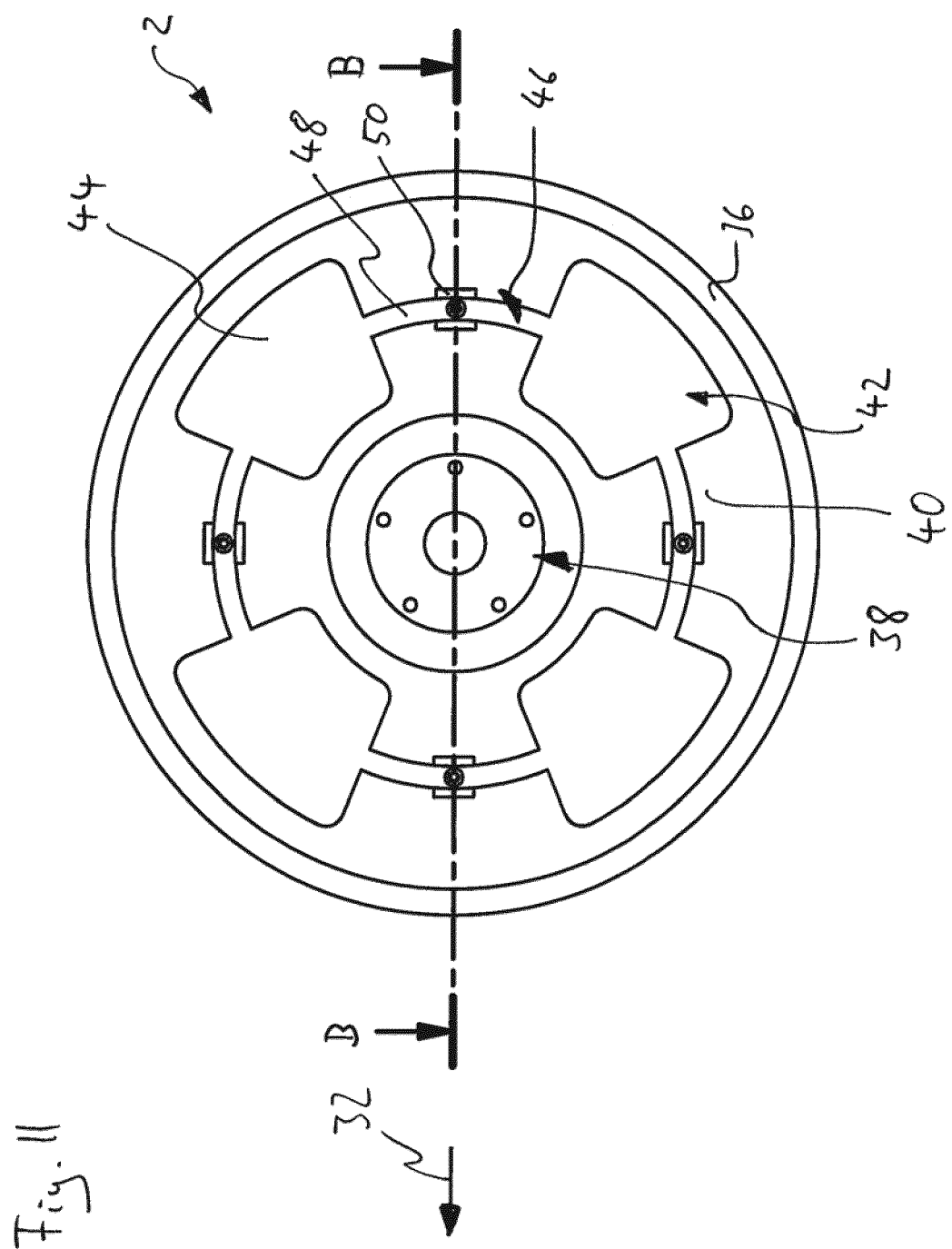
FIGS. 11 to 17 show a vehicle wheel according to the invention of a further embodiment a further embodiment of the compressor arrangement.
Figure 12:
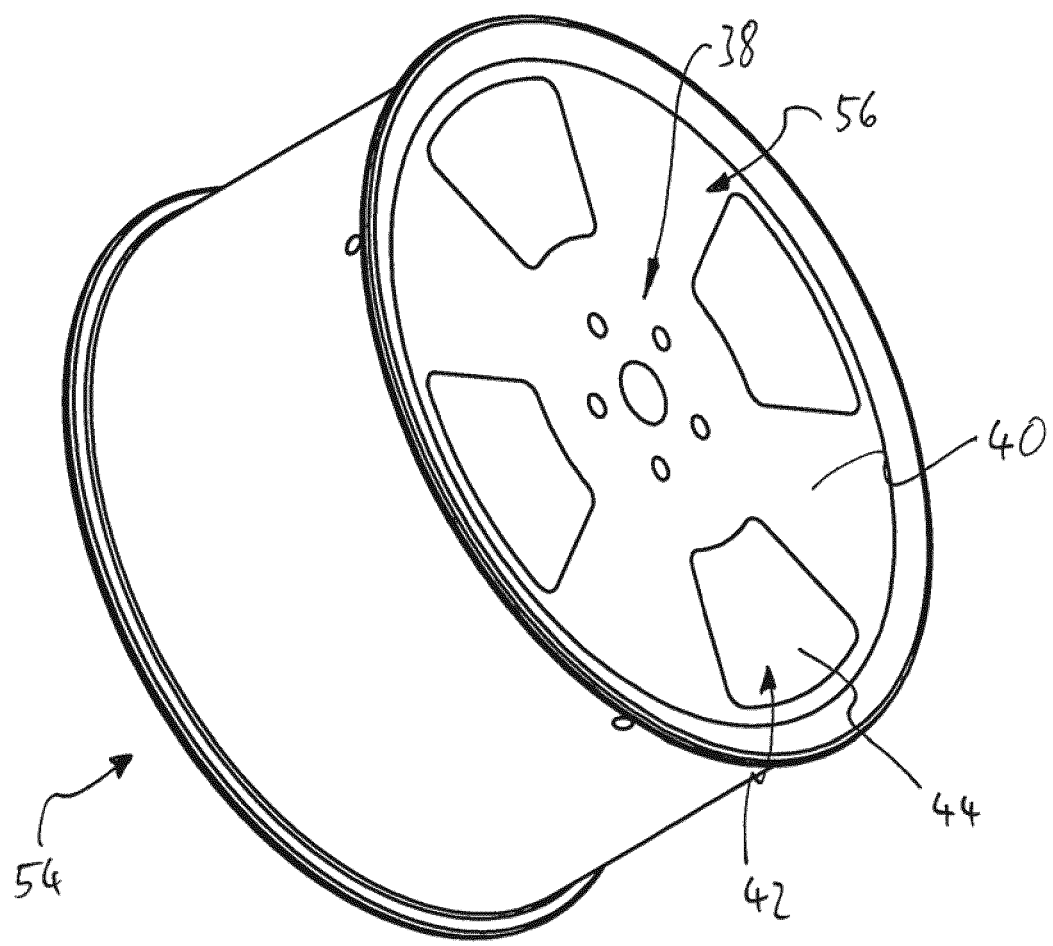
Figure 13:
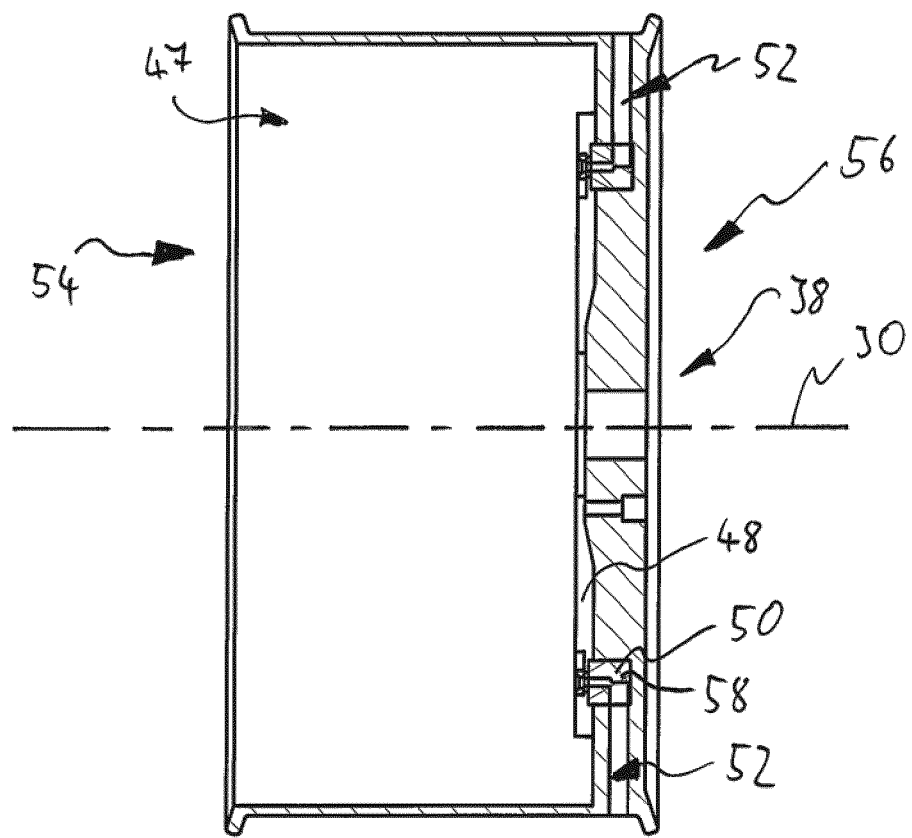
Figure 14:
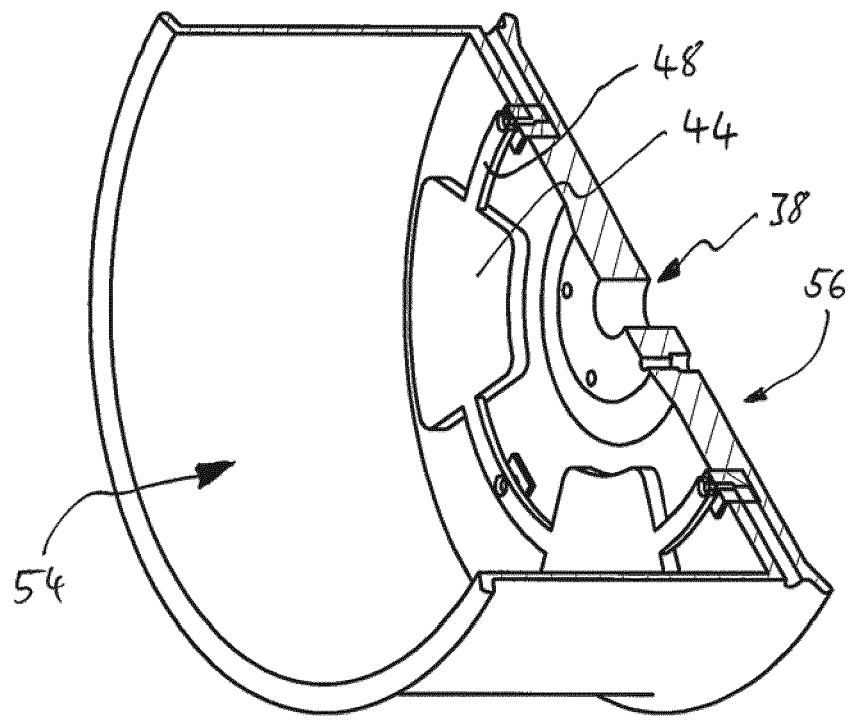

FIGS. 4 to 8 show the cover elements 44 in each case in the first position, in which in this embodiment they close the interspaces 42 completely. FIGS. 7, 8 and 10 each show the vehicle wheel 2 cut along line A-A from FIG. 4.

Figure 9:
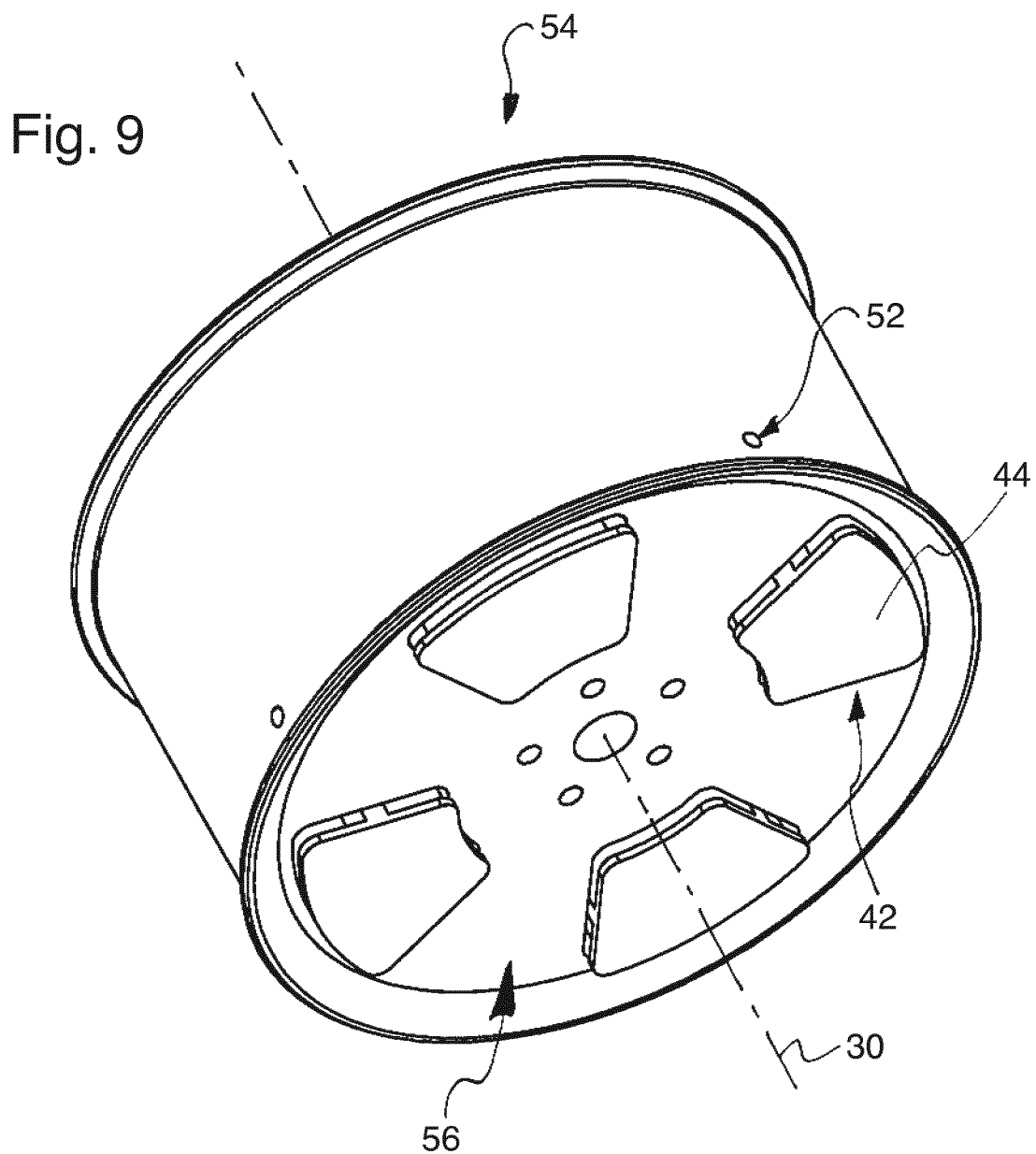

In FIGS. 9 and 10, the vehicle wheel 2 of FIGS. 4 to 8 is shown in a state in which the cover elements 44 are in a second position.

Figure 5:
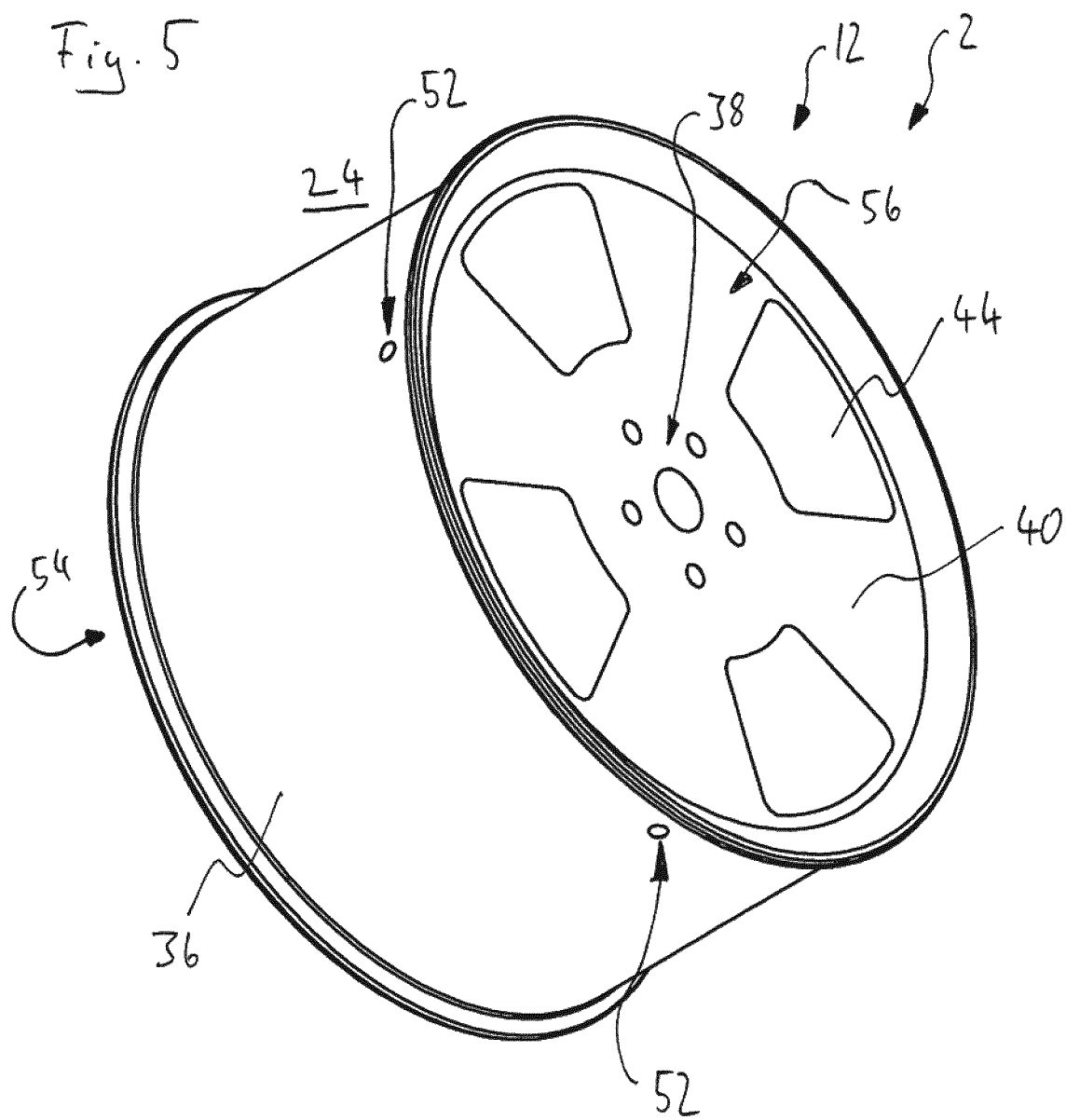
Figure 6:
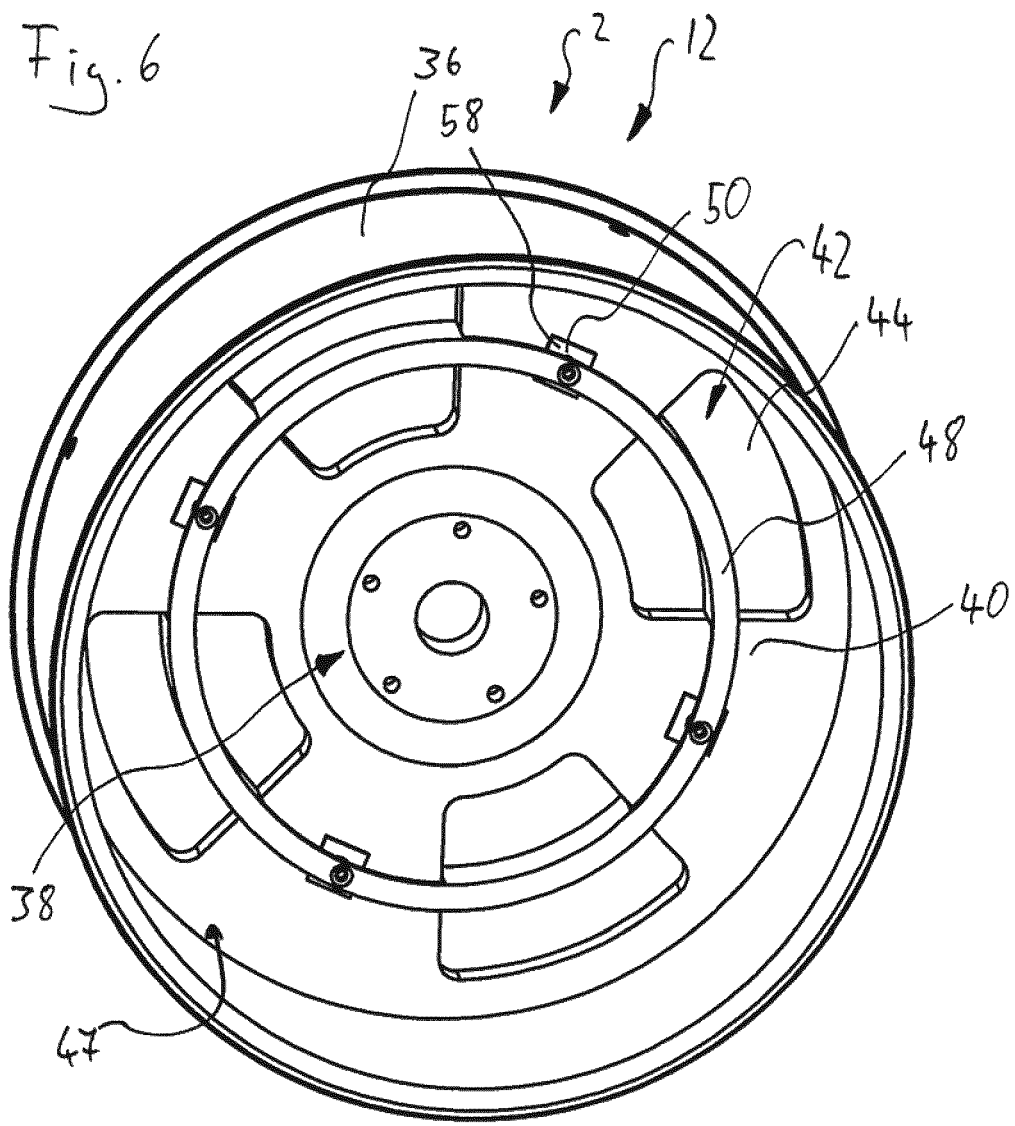

In this second position, the cover elements 44 cover the interspaces 42 less than in the first position. More precisely, the cover elements in the embodiment shown are displaced, as viewed along the axis of rotation 30, from a wheel carrier side 54 of the vehicle wheel 2 towards an outer side 56. FIG. 9 shows a perspective representation similar to the representation of FIG. 5, and FIG. 10 shows a cutaway representation similar to the representation of FIG. 7.

The displacement of the cover elements 44 as just described takes place by pneumatic actuation. This pneumatic actuation takes place via the actuators 50.

The actuators 50 each comprise switching units 58, with which the annular actuating element 48 can be displaced by the application of pressure medium. The pressurized pressure medium comes from the tire cavity 24.

The switching units 58 are so configured that the cover elements 44 can be transferred via the annular actuating element 48 from the first position into the second position and from the second position back into the first position by pneumatic actuation. On switching of the direction of movement of the cover elements 44 on pneumatic actuation can be achieved via the switching units 58.

Actuation of the actuators and thus the pneumatic actuation of the cover elements 44 themselves is also controlled via the switching units 58.

For that purpose, the switching units 58 can be coupled with the brake comprising the brake disc 14, namely in such a manner that, on operation of the brake, they transfer the cover elements 44 into the second position (FIGS. 9 and 10). It is also conceivable that the cover elements 44 are transferred into the second position (FIGS. 9 and 10) by a switching operation of the switching units 58 when a temperature of the brake disc 14 exceeds a specific value.

Figure 15:
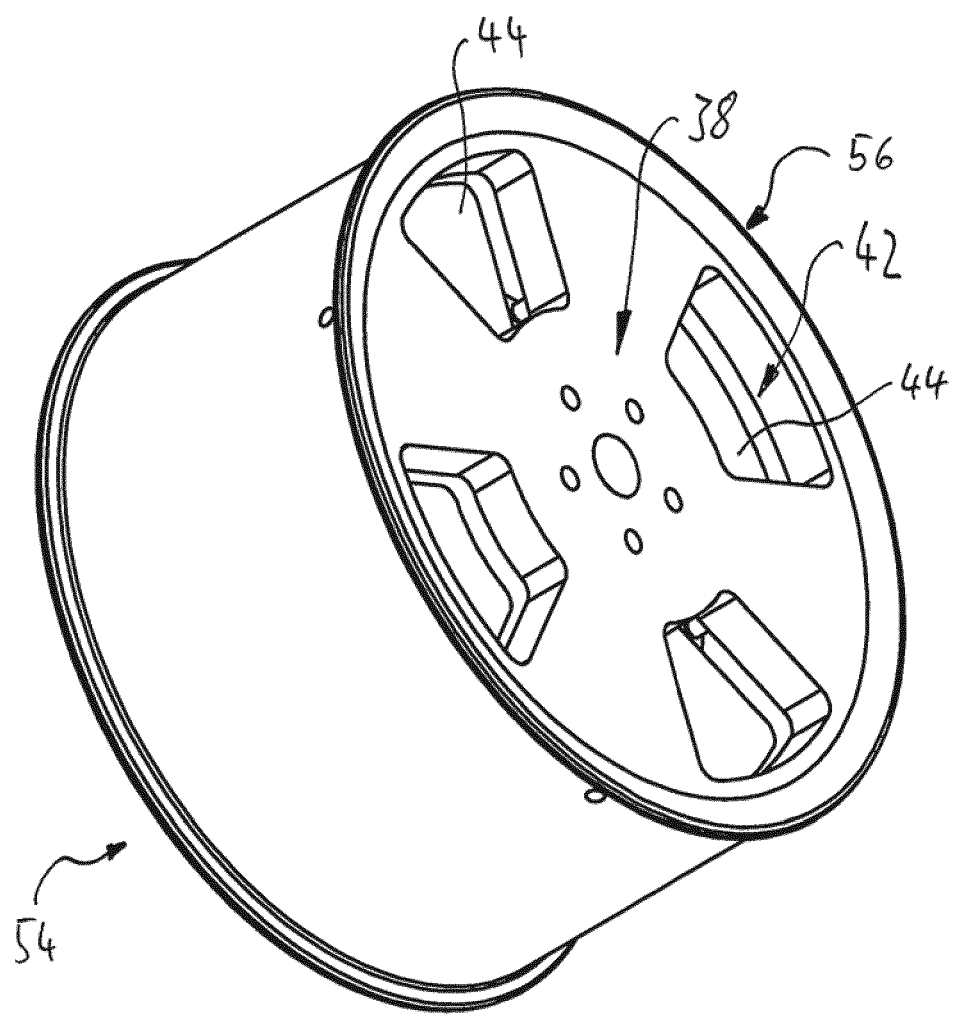
Figure 16:
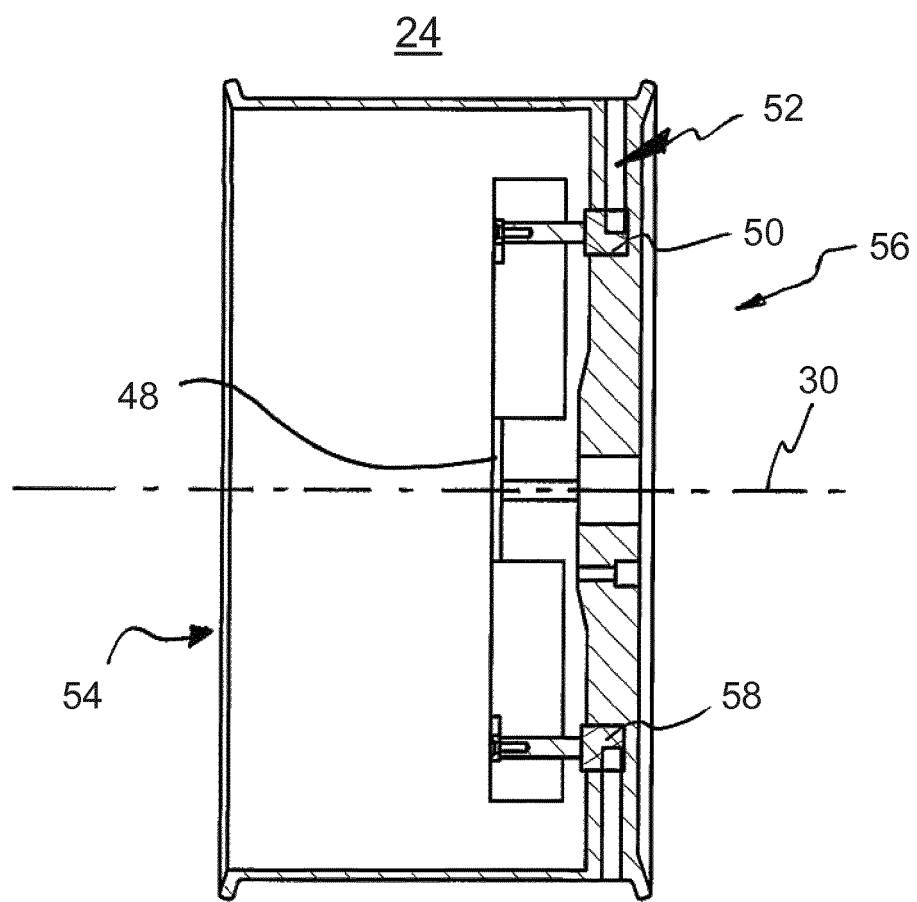
Figure 17:
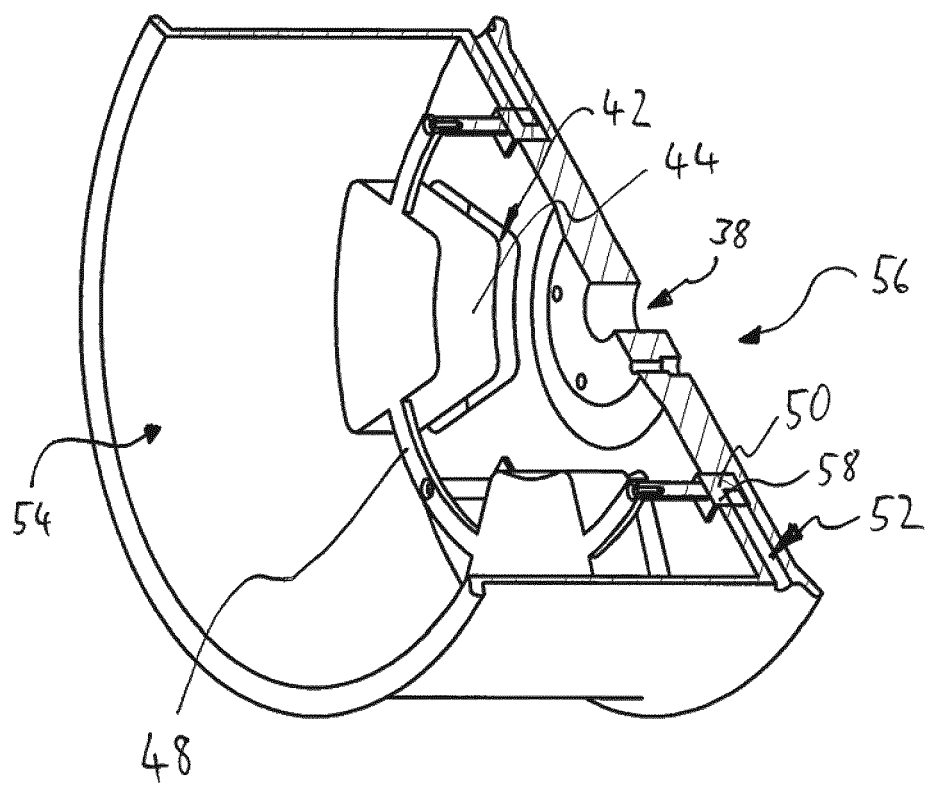

FIGS. 11 to 17 show an alternative embodiment of the vehicle wheel 2 according to the invention. FIGS. 11 to 14 show the cover elements 44 in the first position. In this first position, the interspaces 42 are completely closed by the cover elements 44. In FIGS. 15 to 17, the vehicle wheel 2 of this embodiment is shown with the cover elements 44 in the second position. In this second position, the cover elements 44 are displaced in the axial direction, that is to say in the direction of the axis of rotation 30, towards the wheel carrier side 54 of the vehicle wheel 2. The interspaces 42 are thus each open.

The embodiment of the vehicle wheel 2 shown in FIGS. 11 to 17 thus differs from the embodiment shown in FIGS. 4 to 10 in that, although the movement of the cover elements 44 on opening, that is to say on transfer from the first position into the second position, likewise takes place along the axis of rotation 30, it takes place in the opposite direction.

FIGS. 18 to 25 show a vehicle wheel 2 of a further embodiment. In FIGS. 18 to 21, the cover elements 44 of the vehicle wheel are in each case shown in the second position. In FIGS. 22 to 25, the cover elements 44 are in each case shown in the first position. In the first position, the cover elements 44 in the present embodiment close the interspaces 42 completely.

In the second position, the cover elements 44 are tilted relative to the support portions 40, whereby the interspaces 42 are opened. The cover elements 44 are so tilted that, on rotation of the vehicle wheel 2 in the direction of rotation indicated by the reference numeral 60, air passes or is guided over the cover elements 44 to the wheel carrier side 54 of the vehicle wheel 2.

Figure 18:
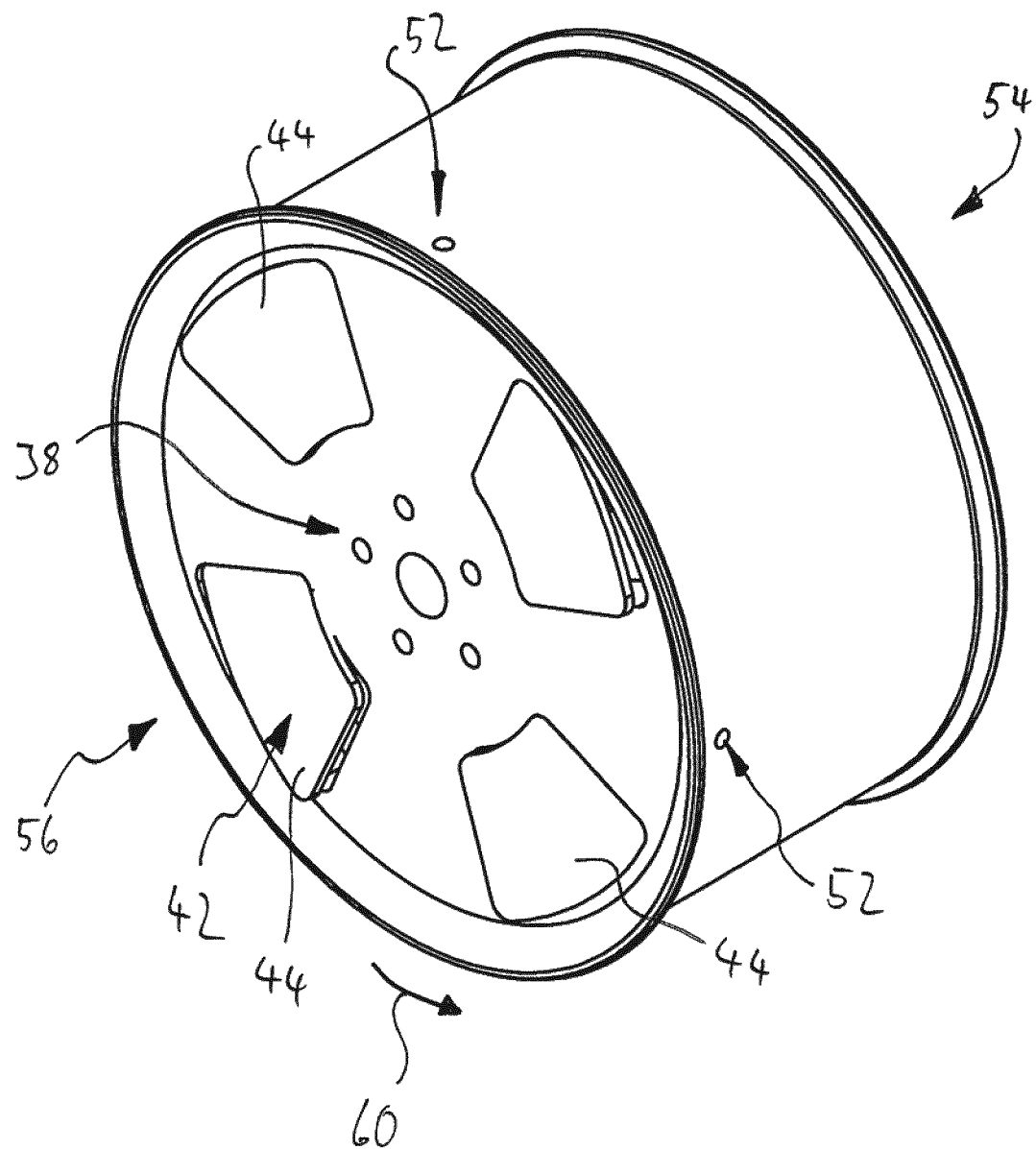
FIGS. 18 to 25 show a vehicle wheel according to the invention of a further embodiment.
Figure 19:
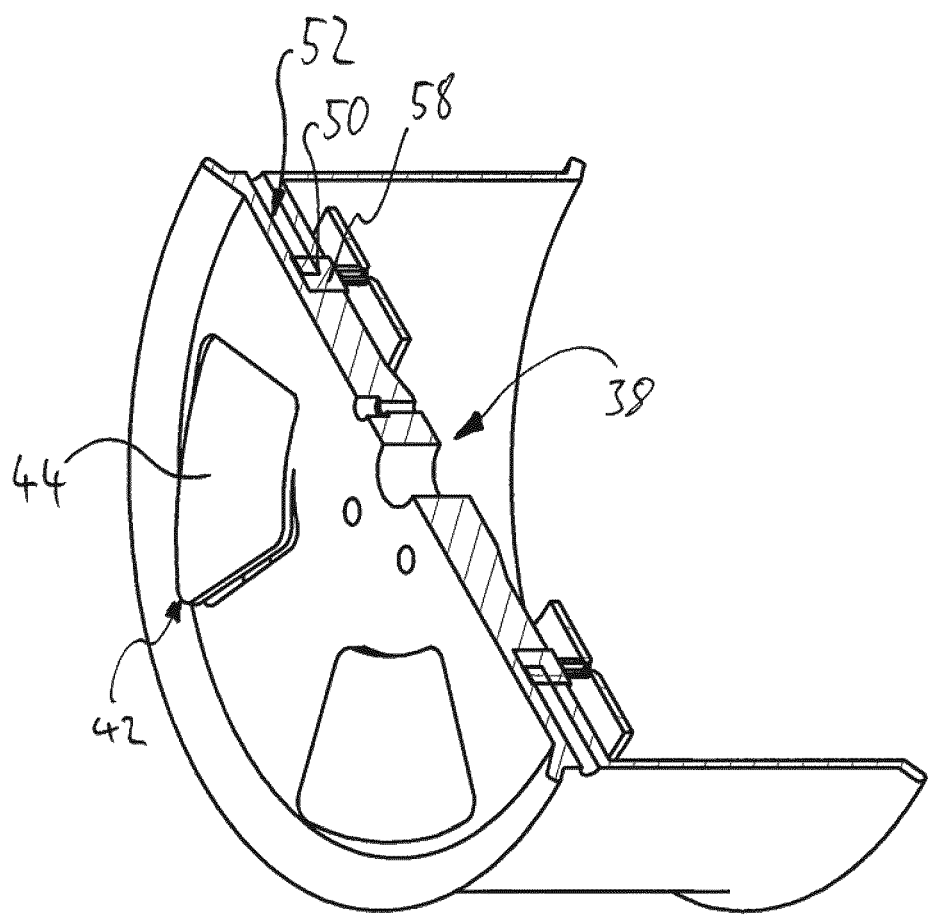
Figure 20:
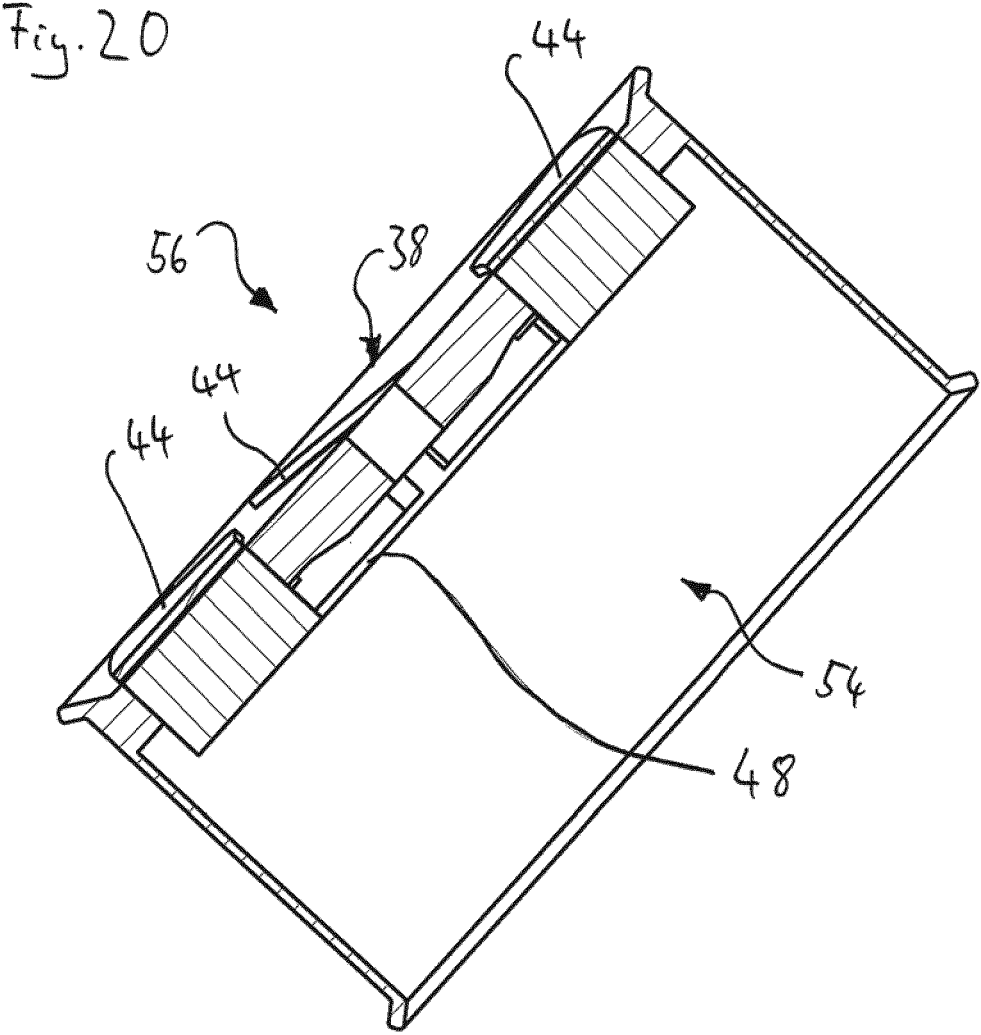
Figure 21:
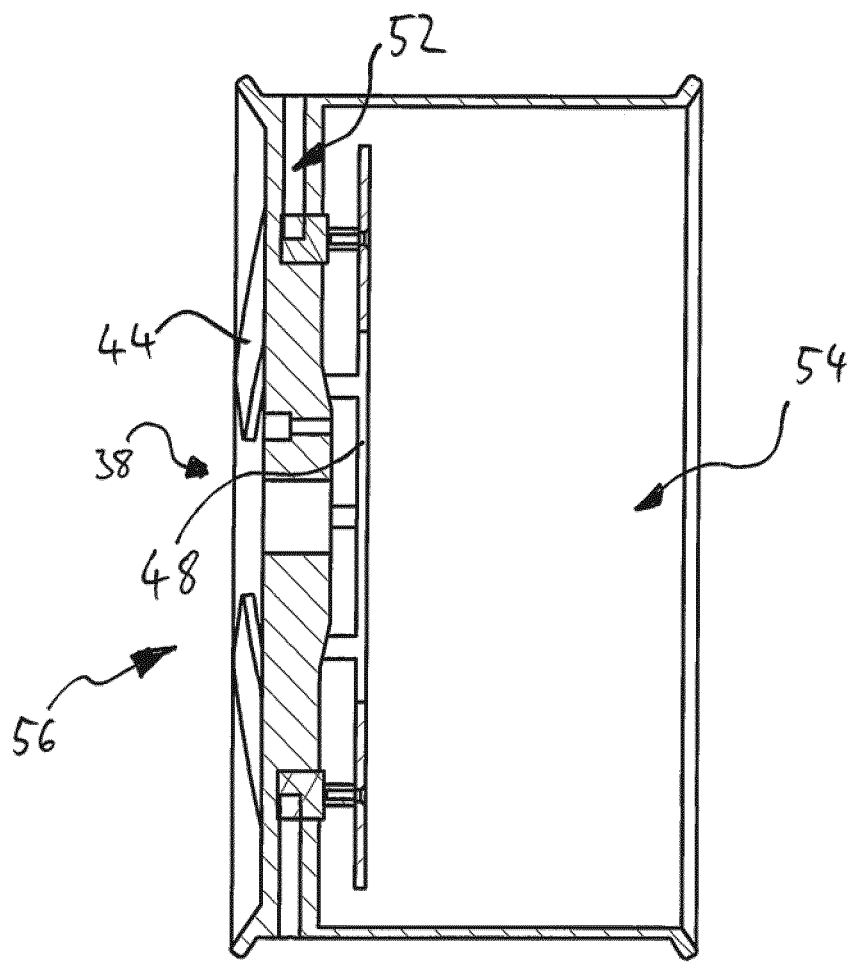
Figure 22:
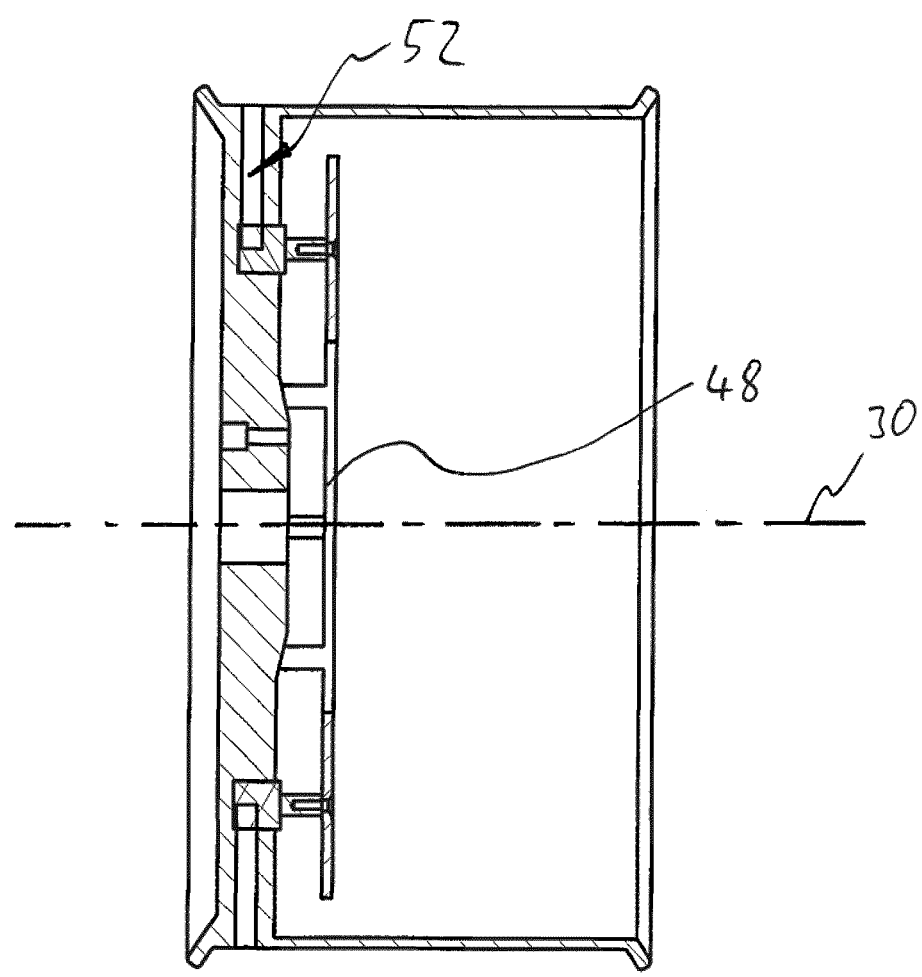
Figure 23:
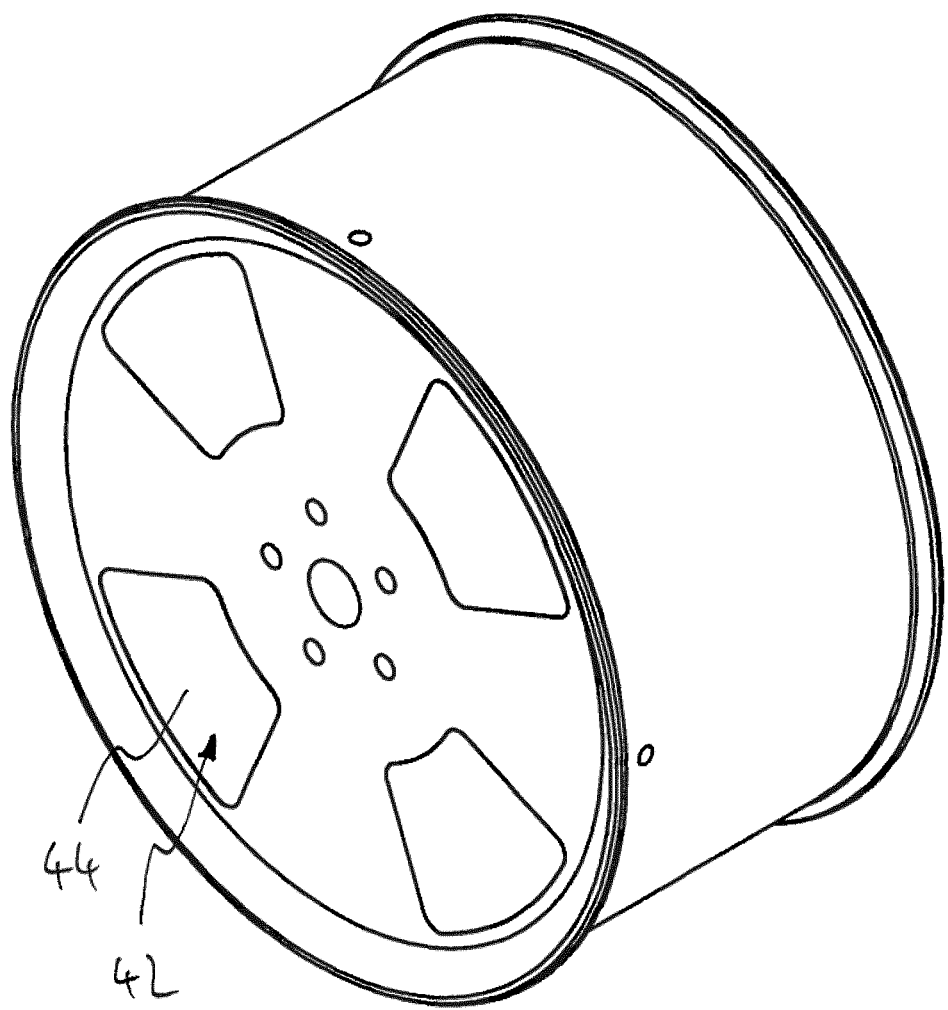
Figure 24:
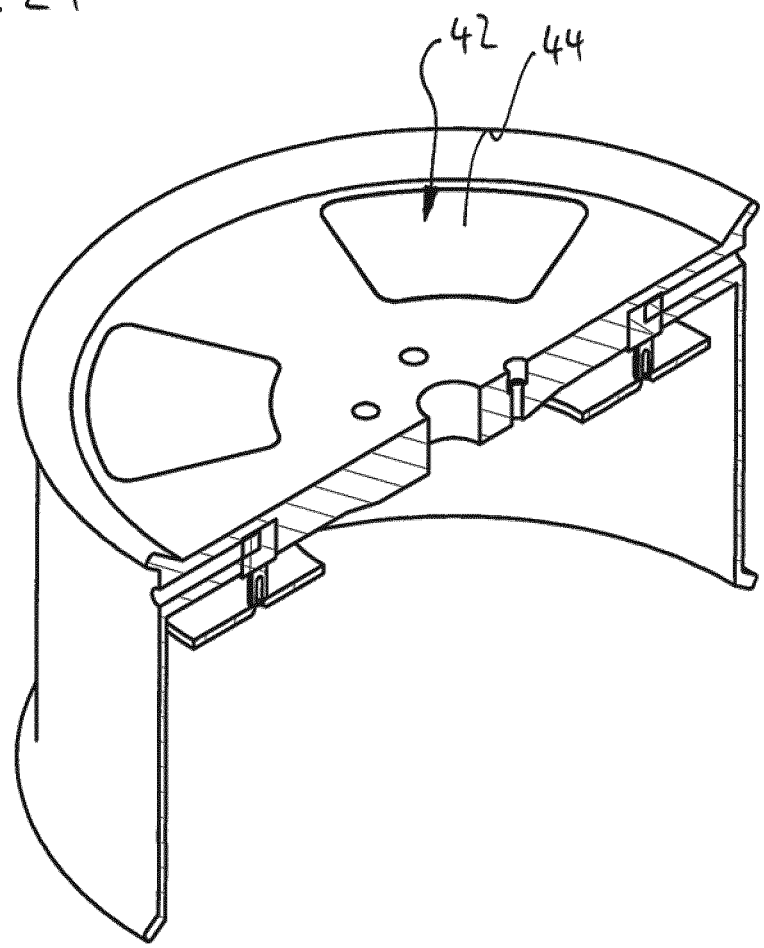
Figure 25:
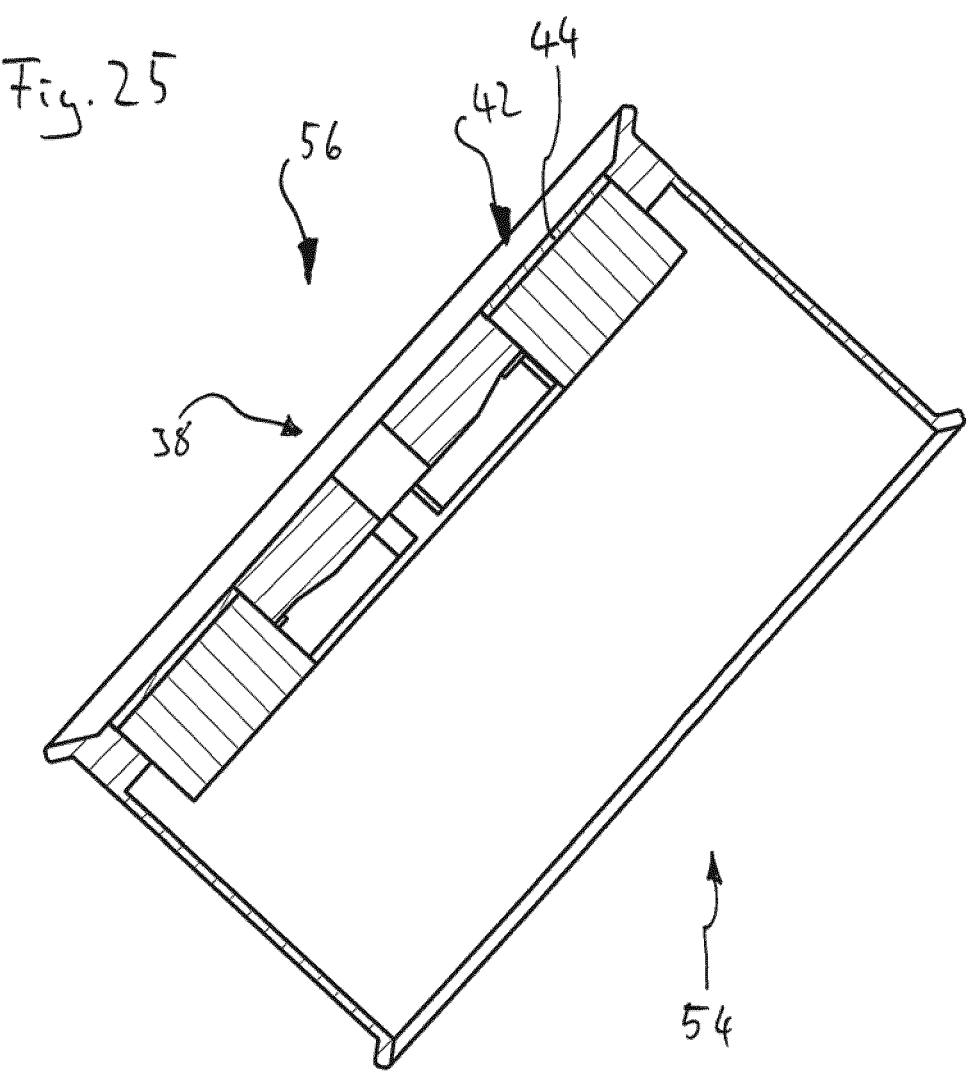
Figure 26:
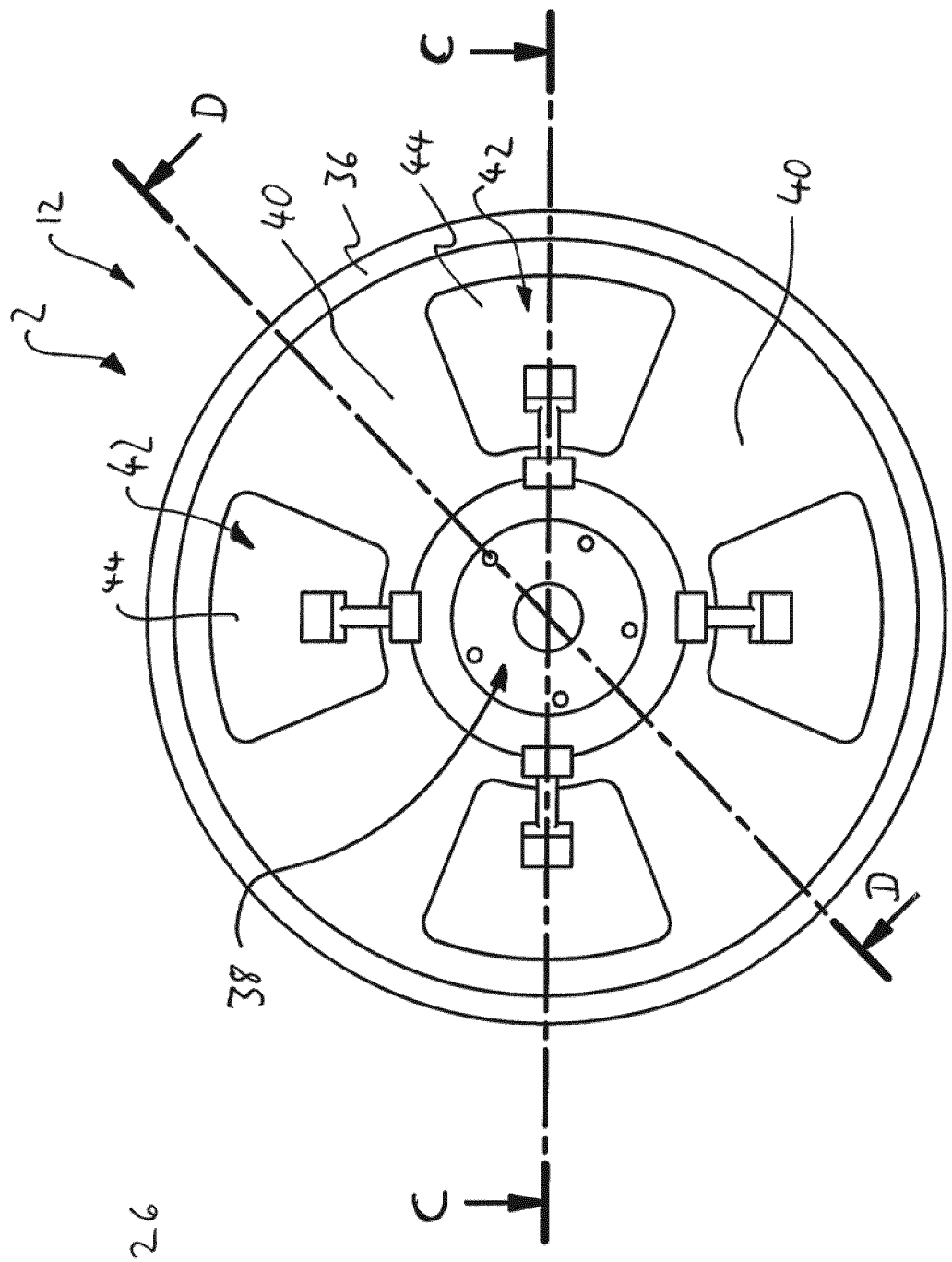
FIGS. 26 to 31 show a vehicle wheel according to the invention of a further embodiment.
Figure 27:
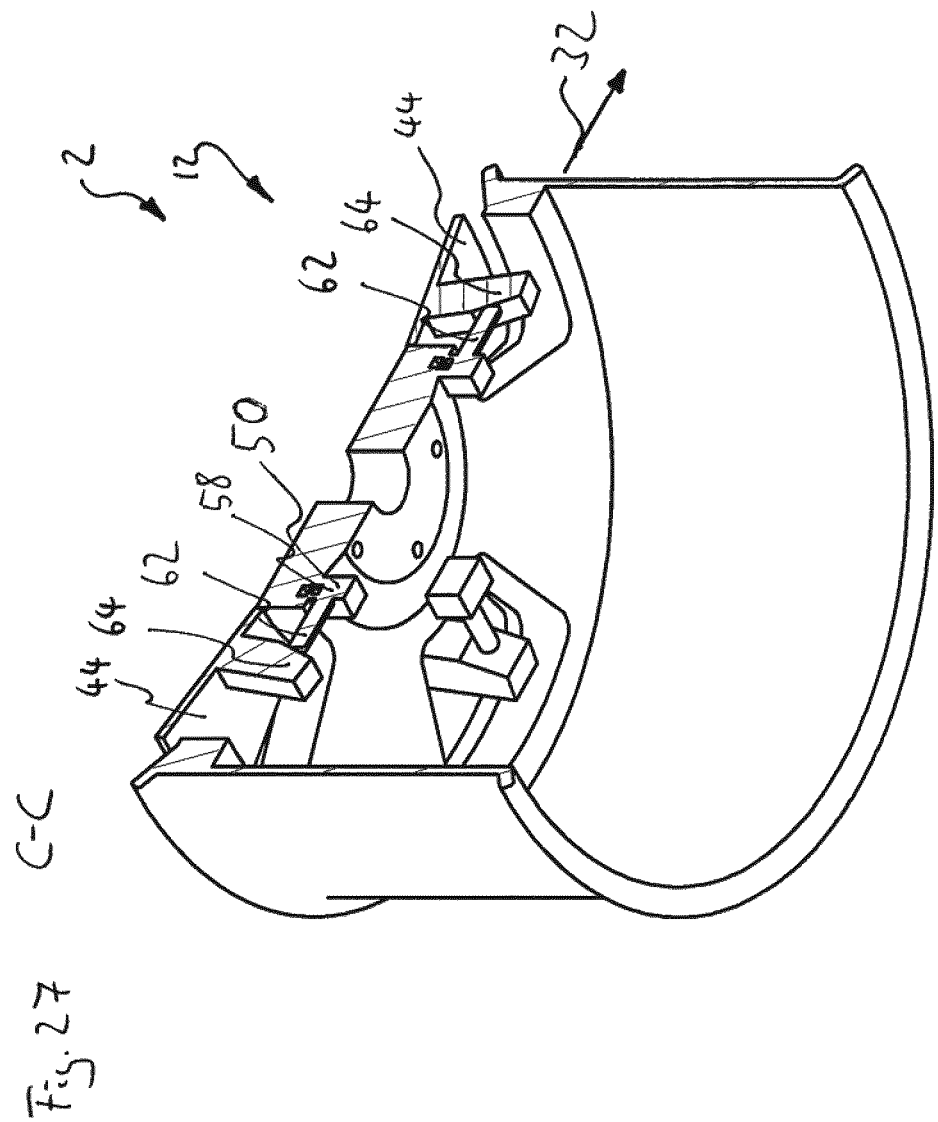
Figure 28:
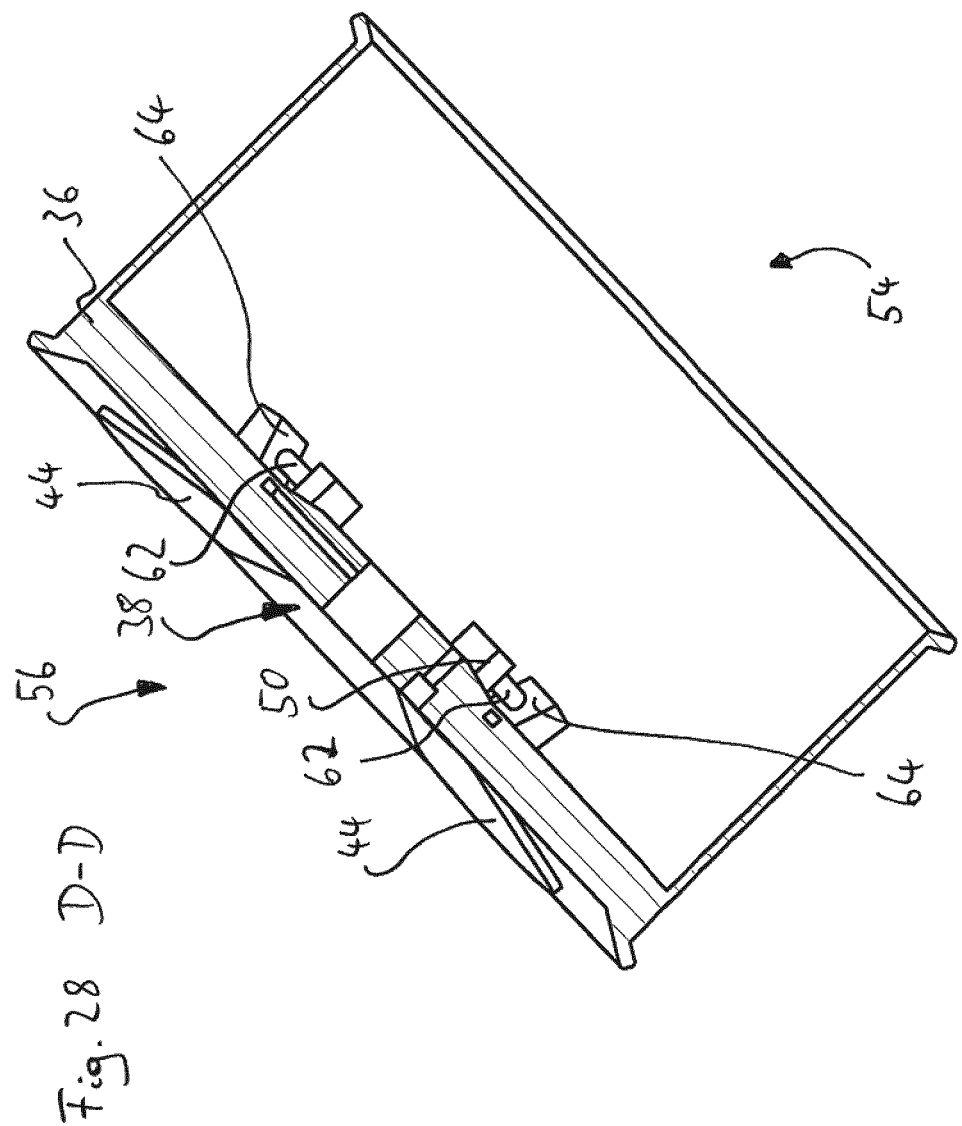
Figure 29:
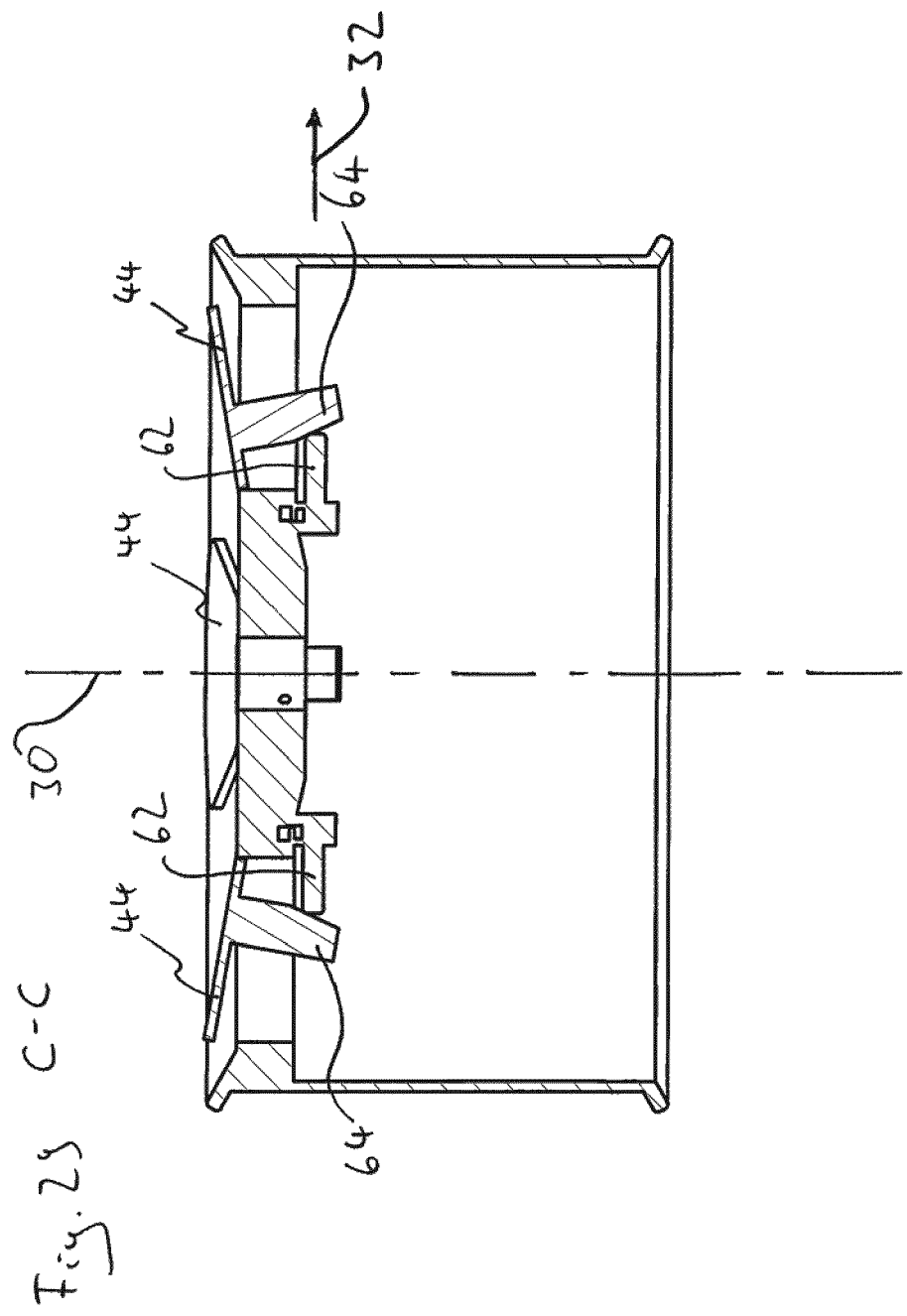

In order to be independent of the installation direction, or of the direction of travel of the vehicle, the cover elements 44 open, or tilt, in different directions, which is clearly visible, for example, in FIG. 18. The cover elements 44 arranged diametrically opposite one another open, when viewed in the circumferential direction, in the opposite direction.

Figure 30:
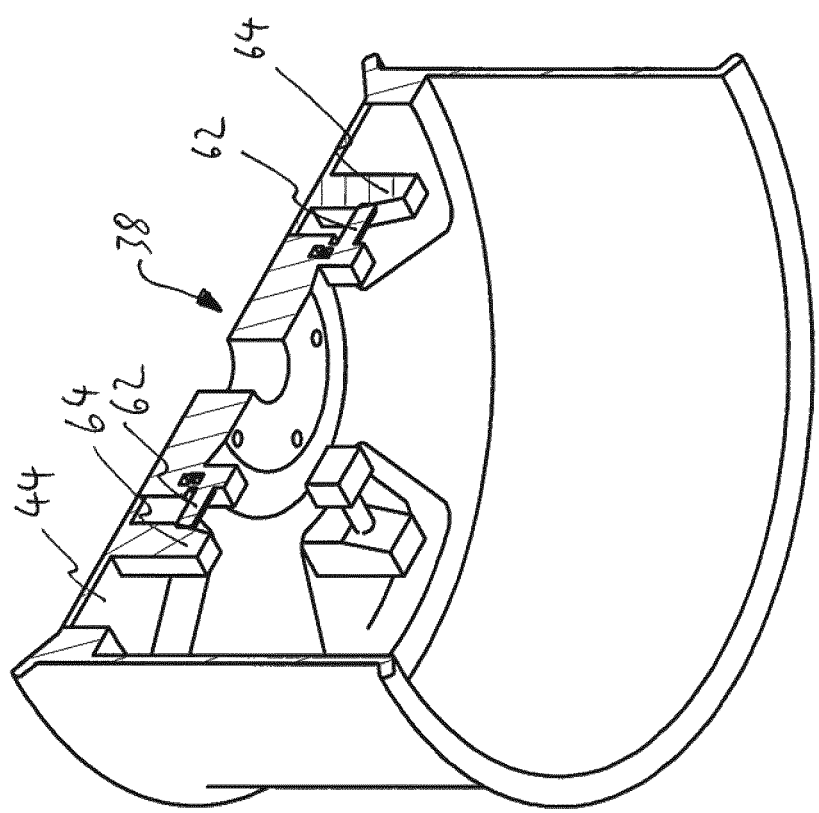
Figure 31:
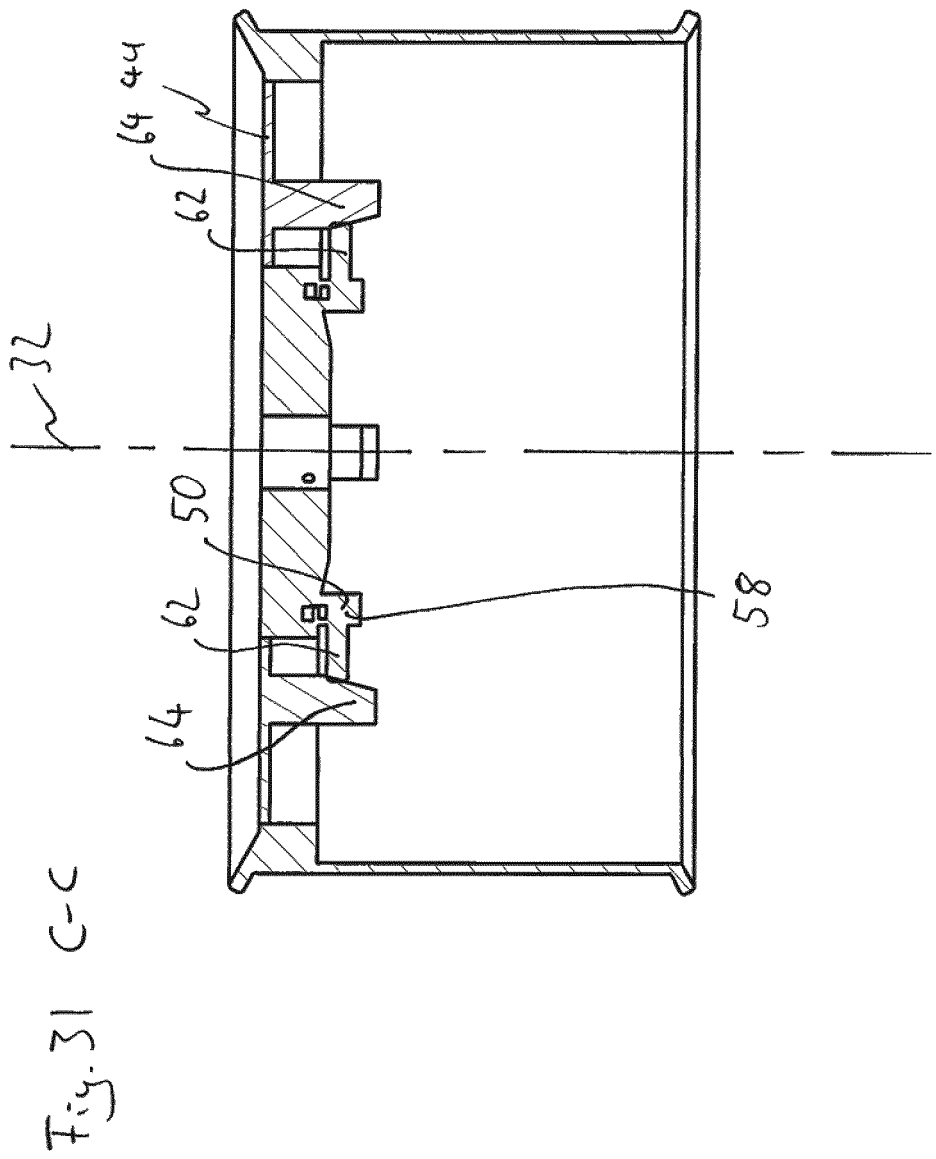
Figure 32:
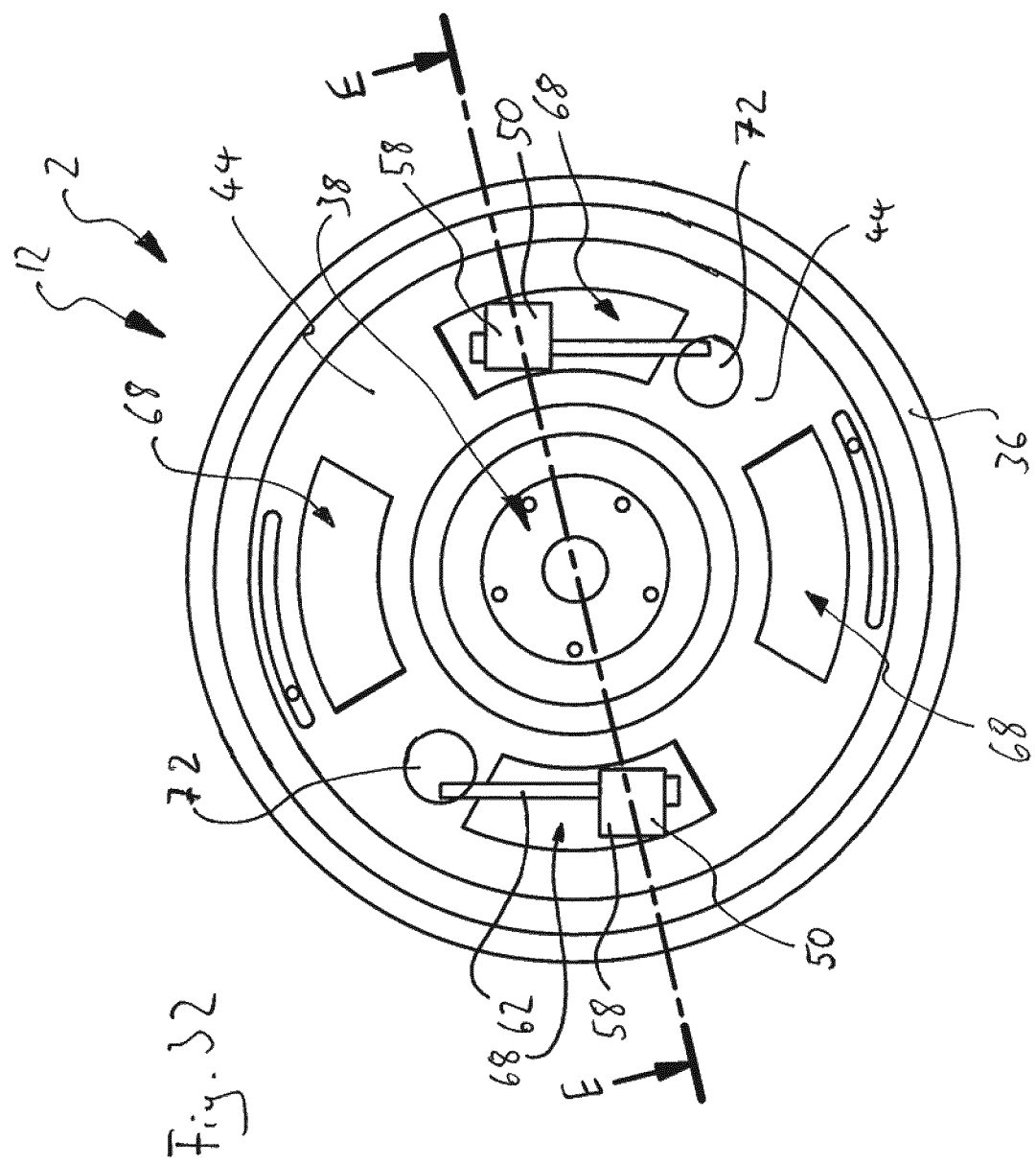
FIGS. 32 to 40 show a vehicle wheel according to the invention of a further embodiment.
Figure 33:
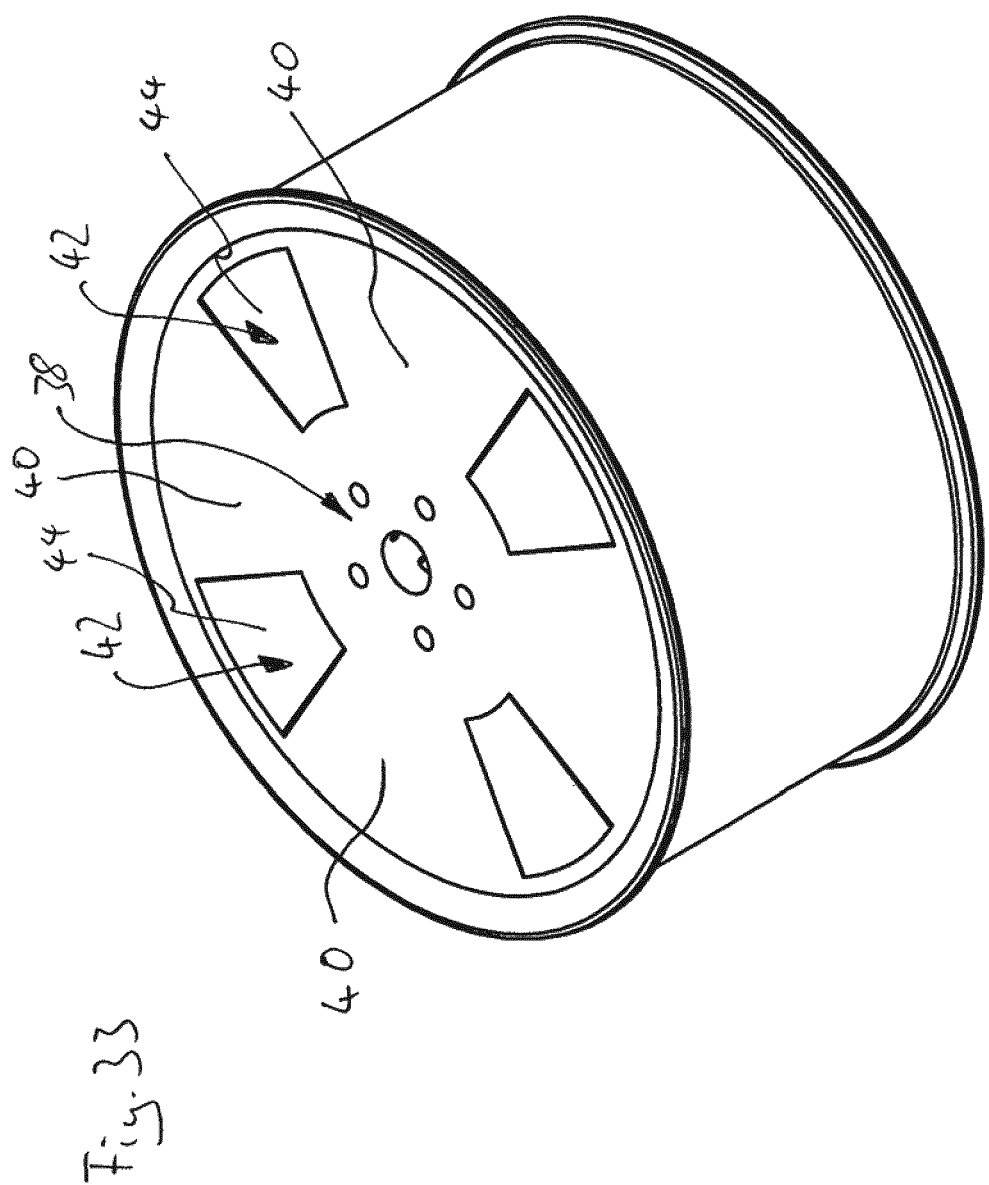

FIGS. 26 to 31 show a vehicle wheel 2 of a further embodiment. In FIGS. 26 to 29, the cover elements 44 of the vehicle wheel 2 are in each case shown in the second position. In FIGS. 30 to 31, the cover elements 44 are in each case shown in the first position, in which they close the interspaces 42 completely.

In the second position, the cover elements 44 are tilted relative to the support portions 40, whereby the interspaces 42 are opened. The cover elements 44 are mounted to be tiltable at their radially inner end. This type of tiltable mounting is not essential, however; in the embodiment of FIGS. 18 to 25, for example, the tilt axis runs largely in the radial direction 32. If the cover elements can be transferred from the first position into the second position by tilting, then the tilt axis can, for example, run in the radial direction 32, be arranged radially outwards on the cover element 44 or be arranged radially inwards on the cover element 44.

The actuators 50 can be configured with plungers 62, as shown in FIGS. 26 to 31. The plunger 62 of each lifting actuator 50 can thereby be extendable and retractable in the radial direction 32, and can rest with its radially outer end on a contact portion 64 of the cover elements 44. If the plunger 62 of a cover element 44 in such an arrangement is pneumatically moved radially outwards, that is to say pneumatically actuates the actuating device 46, then the plunger 62 rests on the bevelled contact portion 64 of the cover element 44 and tilts the cover element 44 by its radially outwardly directed movement.

FIGS. 32 to 40 show a vehicle wheel 2 of a further embodiment. In FIGS. 32, 33 and 34 to 36, the cover elements 44 of the vehicle wheel 2 are in each case shown in the first position, in which they completely close the interspaces 42 in the present case. In FIGS. 37 to 40, the cover elements 44 are in each case shown in the second position, in which they do not completely close the interspaces 42.

The cover elements 44 of the embodiment of FIGS. 32 to 40 are movable between the first position and the second position or between the second position and the first position by a rotational movement relative to the support portions 40.

Figure 34:
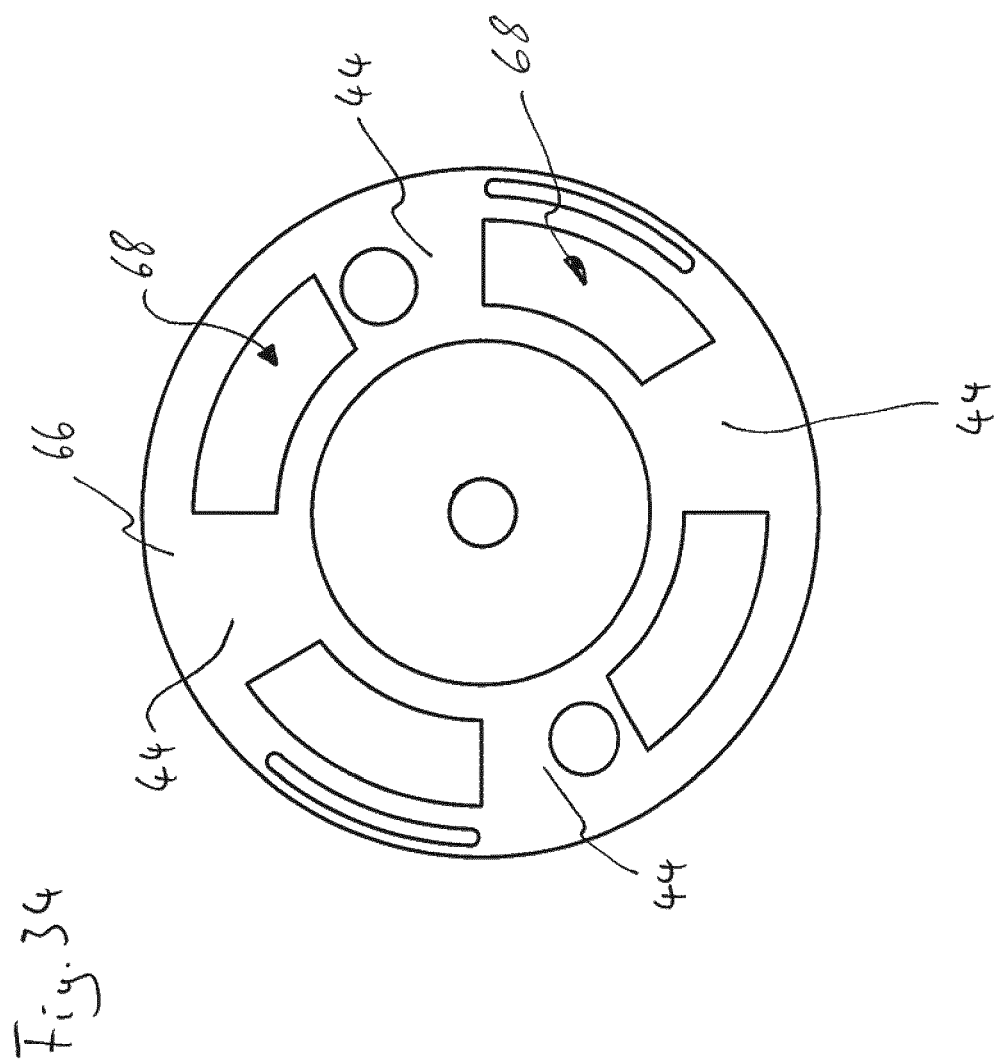
Figure 35:
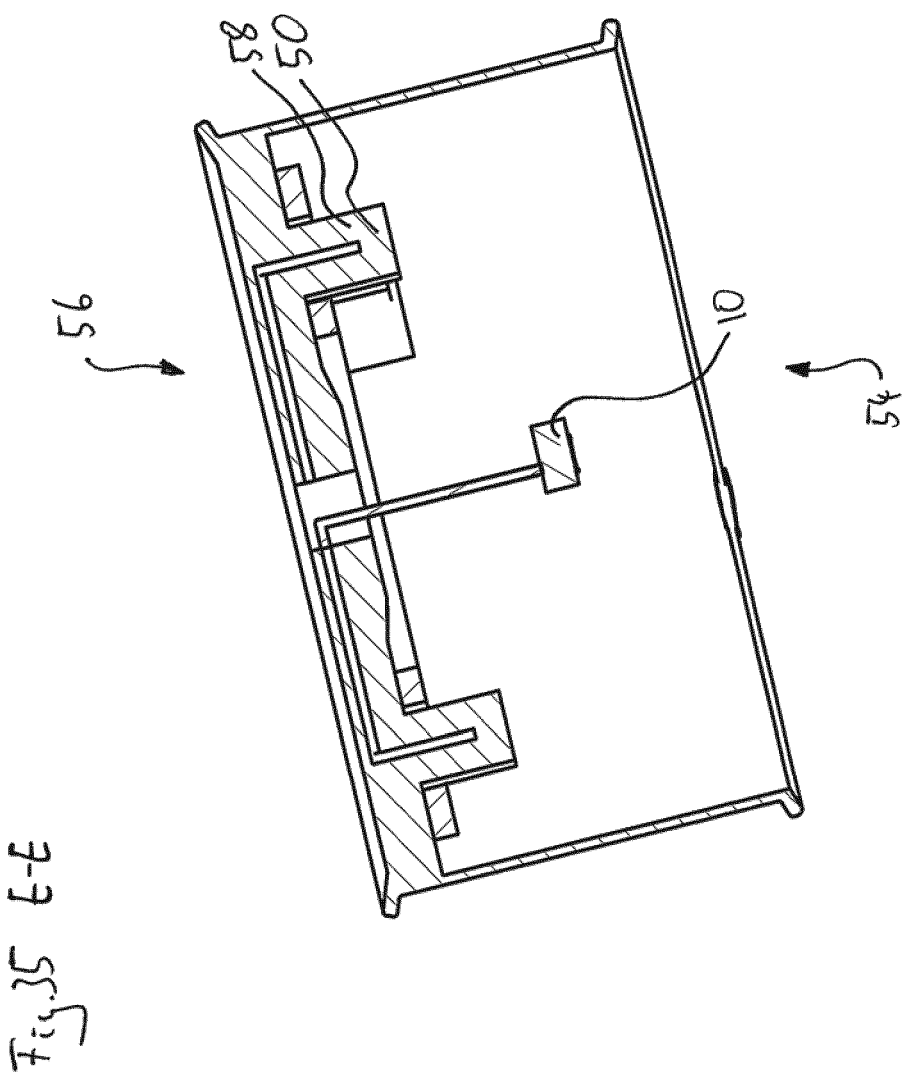
Figure 36:
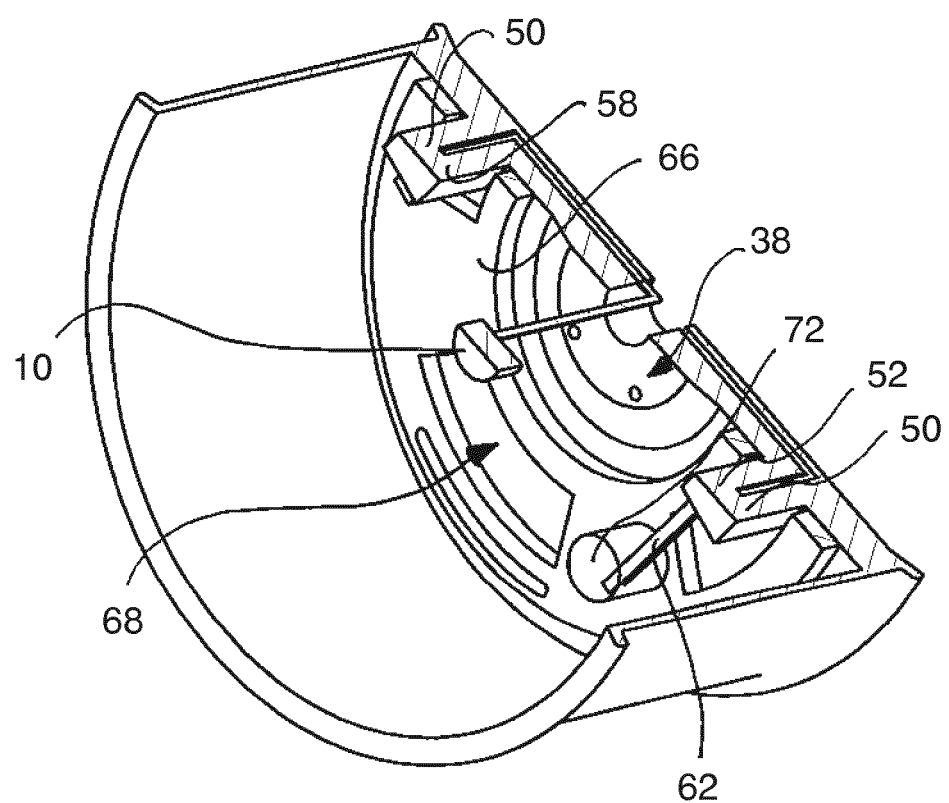
Figure 37:
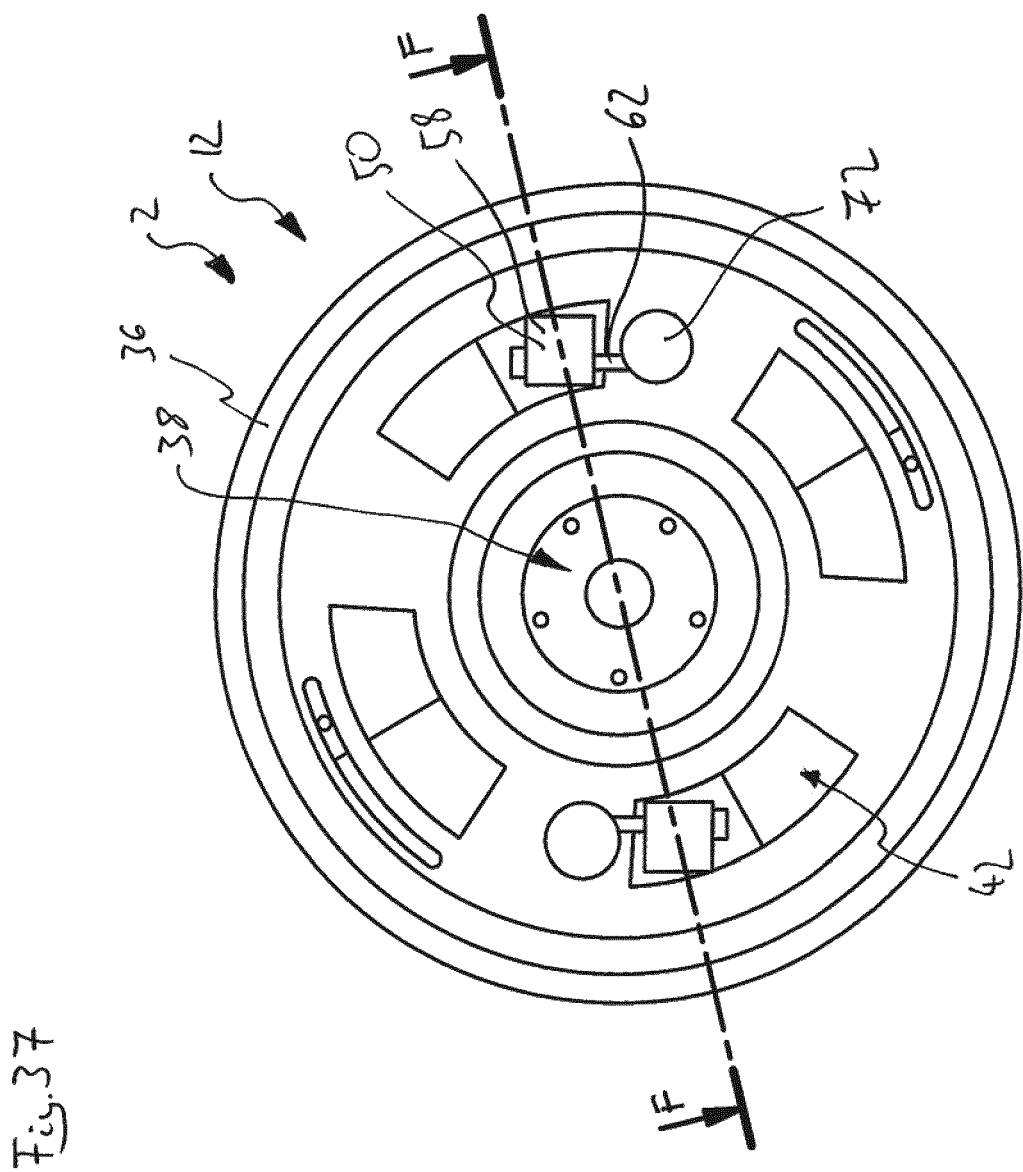
Figure 38:
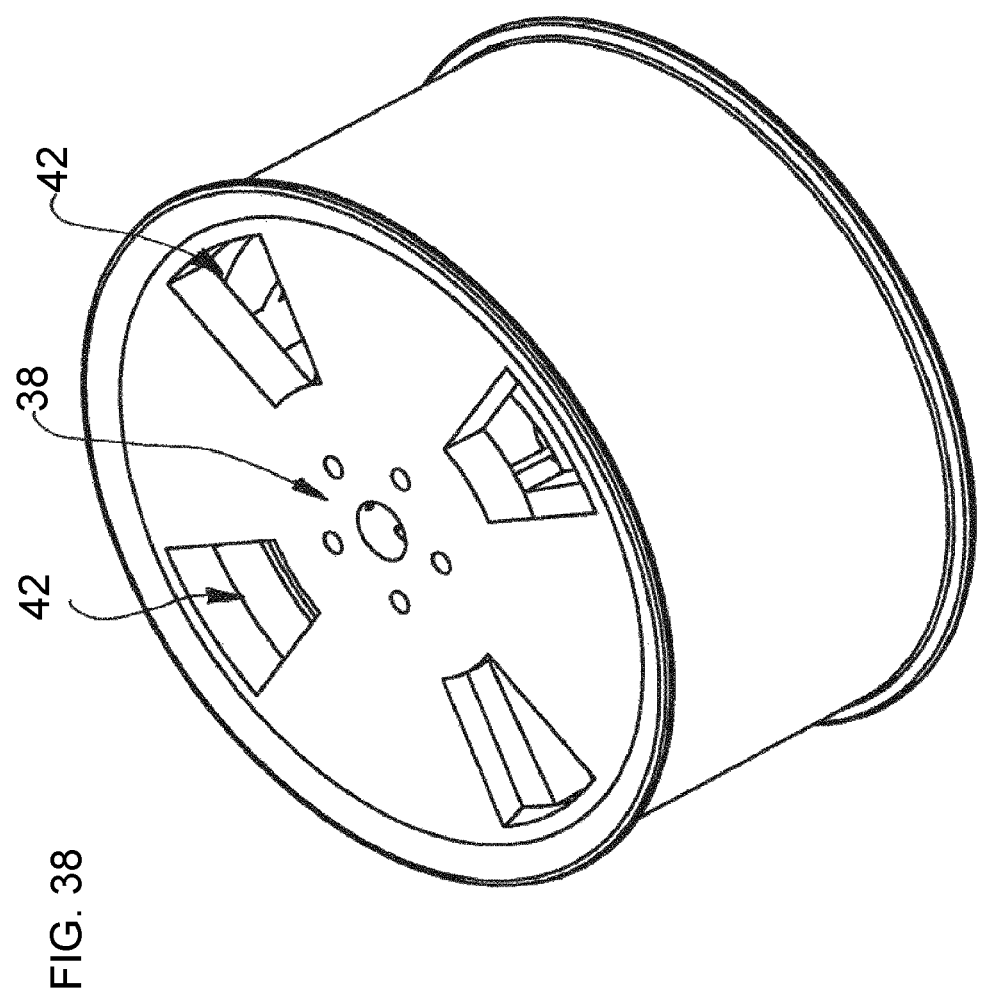
Figure 39:
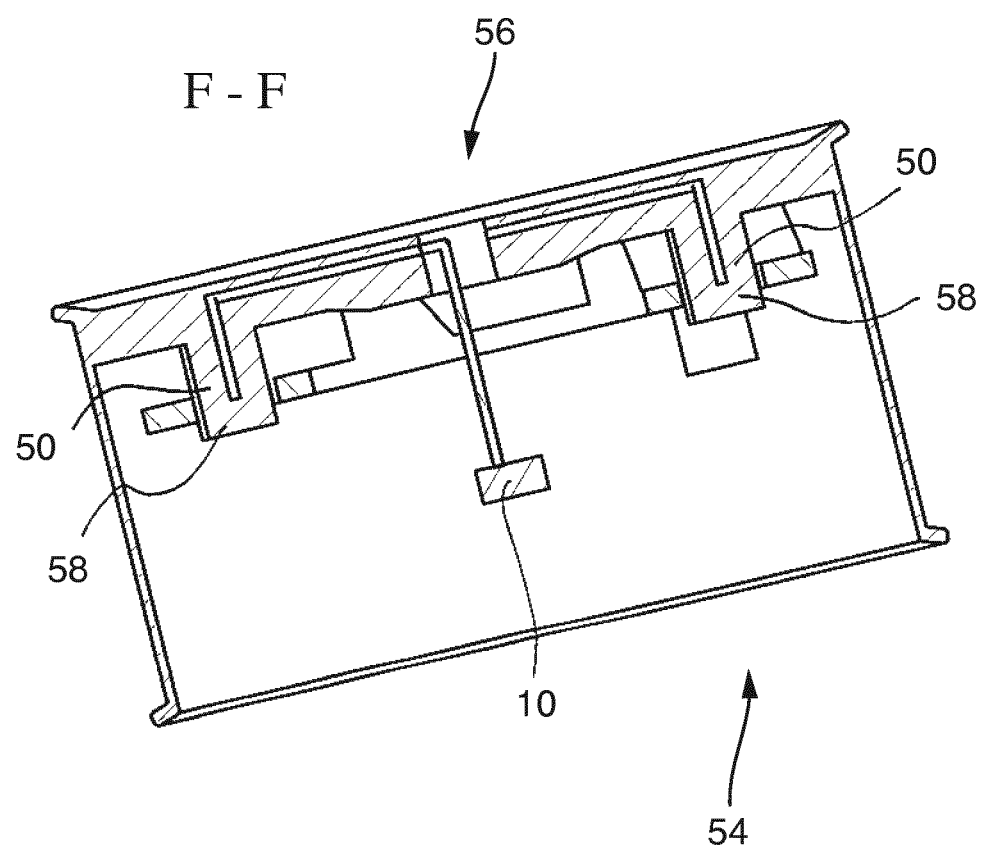
Figure 40:
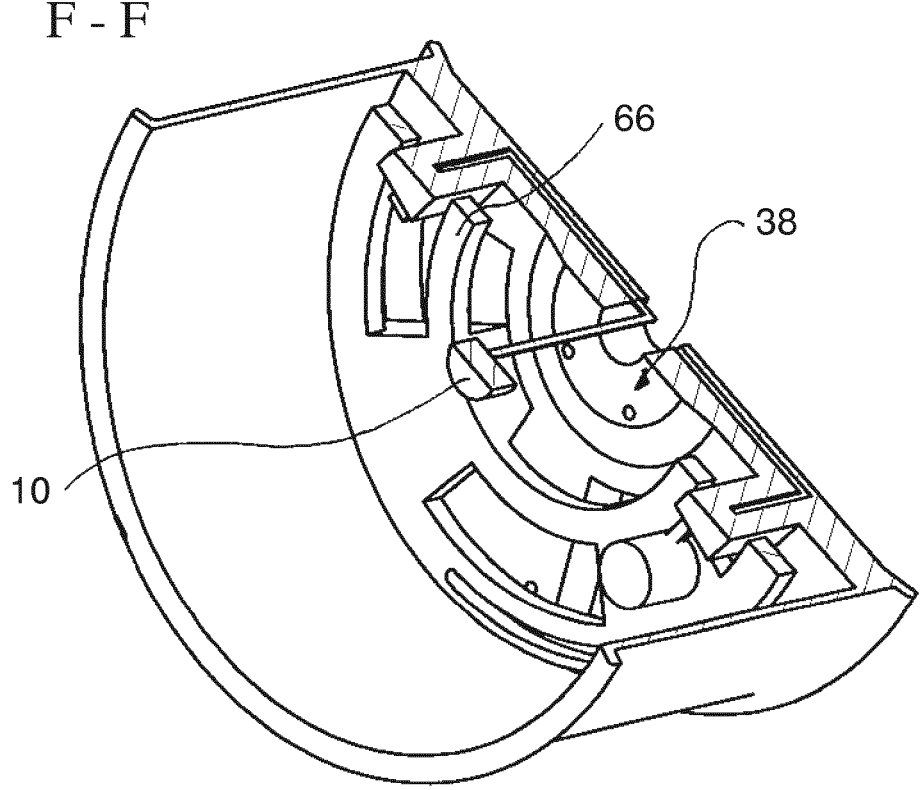

The cover elements 44 can be in the form of a disc-like element 66. Such a disc-like element 66 is shown in FIG. 34. The disc-like element 66 has slot-like openings 68. The slot-like openings 68 serve to permit the rotational movement of the disc-like element 66, or of the cover elements 44, relative to the actuators 50, which are fixedly connected to the wheel rim 12. The actuators 50 are connected via the plungers 62 to link devices 72, which are fixedly connected to the disc-like element 66.

The actuators 50 can be connected to a compressor arrangement 10. Such a connection between the actuators 50 and a compressor arrangement is shown symbolically in FIGS. 35, 36, 39 and 40. Pressure medium can be applied to the actuators via the compressor arrangement 10. The cover elements 44 can thus be pneumatically actuated.

The compressor arrangement is preferably arranged on the hub side. It is, however, also conceivable to connect the actuators 50 via corresponding pressure medium lines having rotary feedthroughs to a vehicle-side compressor device for supplying pressure medium.

Figure 41:
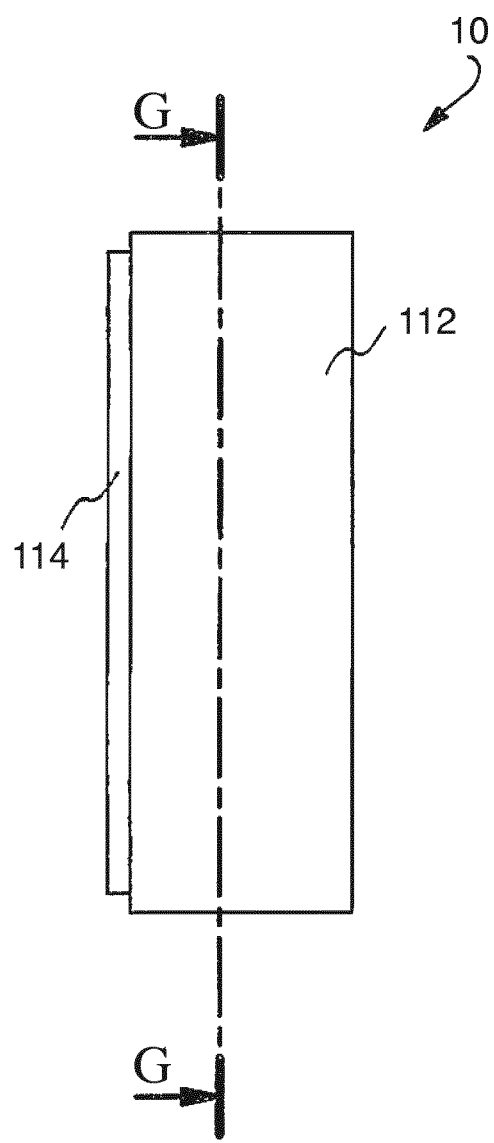
FIGS. 41 to 43 show a compressor arrangement with a radially movable compressor component.
Figure 42:
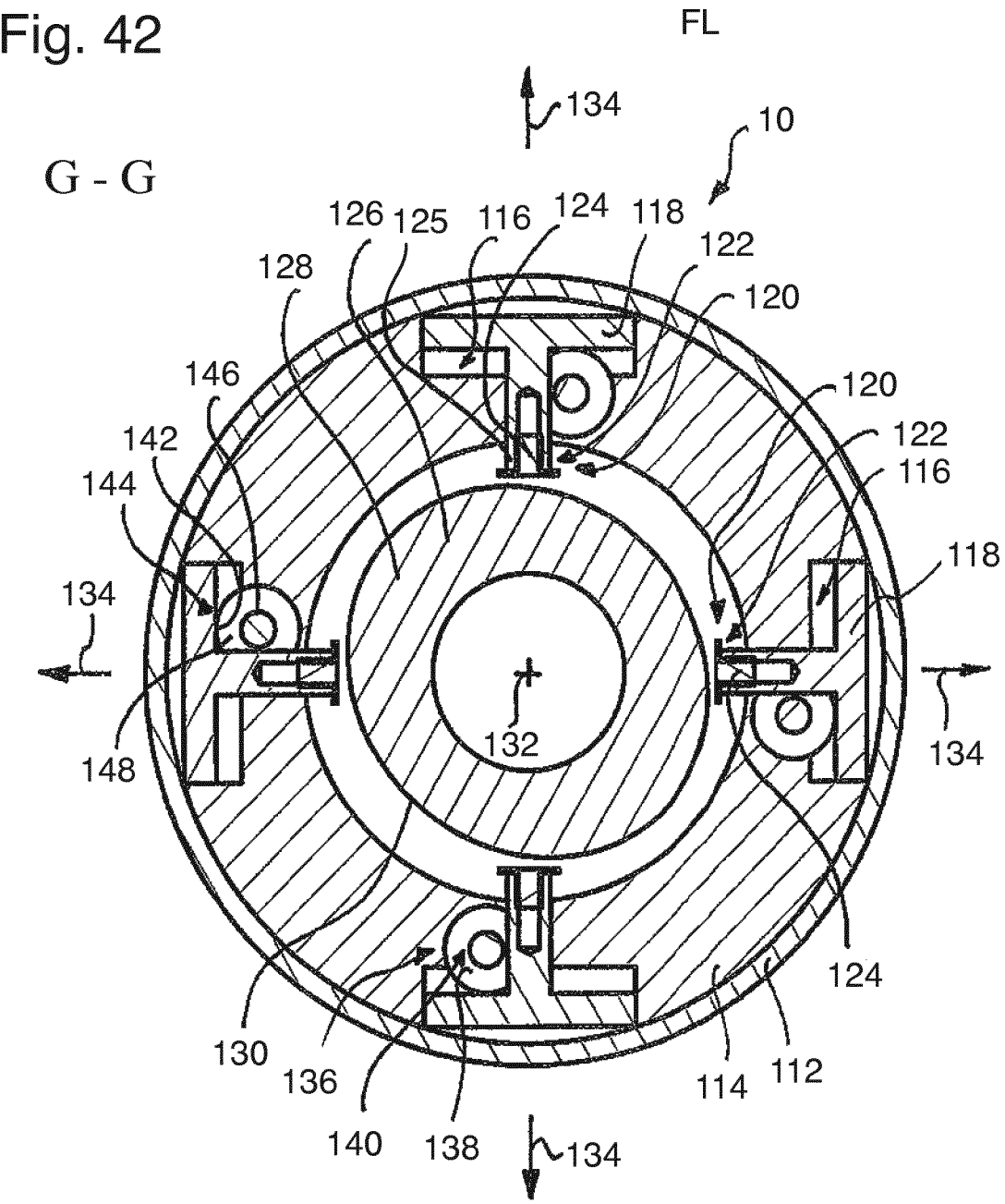
Figure 43:
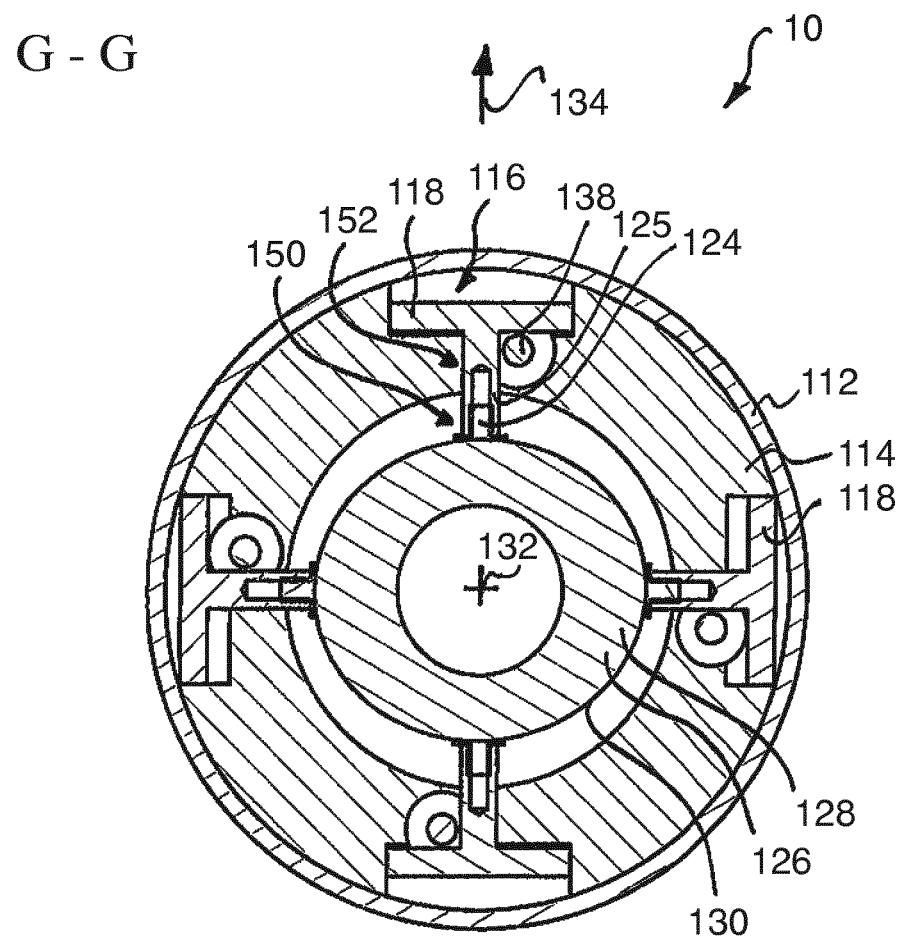

FIGS. 41 to 43 show in detail a first embodiment of a mechanical compressor arrangement 10. The compressor arrangement 10 comprises a first housing part 112 and a second housing part 114.

In FIG. 42, the compressor arrangement 10 of FIG. 41 is shown cut along line G-G. The compressor arrangement 10 in the present case comprises a total of four hub-side compression chambers 116, of which only two have a reference numeral.

Each of the compression chambers 116 has an associated hub-side compressor component 118, of which likewise only two have a reference numeral. The compressor arrangement 10 comprises a plurality of gears 120, wherein a gear 120 is associated with each of the compression chambers 116. The gears 120 are in the present case each in the form of a cam gear 122.

The gears 120 each have a hub-side gear part 124. The hub-side gear parts 124 are each formed by plunger outputs 125. The compressor components 118 are formed in one piece with the plunger outputs 125 or hub-side gear parts 124. The hub-side gear parts 124 of the gears 120 can each cooperate with a wheel-carrier-side gear part 126 of the compressor arrangement 10.

As can be seen in FIG. 42, the compressor arrangement 10 has only a single wheel-carrier-side gear part 126, which is able to cooperate with each of the hub-side gear parts 124. The wheel-carrier-side gear part 126 is in the form of a disc cam 128 with an outer cam contour 130.

In FIG. 42, the compressor arrangement 10 is shown in a freewheel operating state FL. In the freewheel operating state FL, the hub-side gear parts 124 do not cooperate with the wheel-carrier-side gear part 126.

In the freewheel operating state FL, the hub-side gear parts 124, as shown in FIG. 42, are advantageously in a position in which they cannot come into contact with the wheel-carrier-side gear part 126, independently of the orientation thereof. This is achieved by coupling devices 136, which are associated with each of the hub-side gear parts 124. The coupling devices 136 each comprise a coupling element 138. In the freewheel operating state shown in FIG. 2, the coupling elements 138 are each in a blocking position 140. In the blocking position 140 of the coupling element 138, the hub-side gear parts 124 are each prevented from cooperating with, and in the present case also coming into contact with, the wheel-carrier-side gear part 126.

In the blocking position 140, a blocking portion 142 of each of the coupling elements 138 rests on a stop portion 144 of each of the hub-side gear parts 124. The stop portion 144 is in the present case formed on the compressor component 118 formed in one piece with the hub-side gear part 124.

In the present case, the coupling elements 138 are in the form of pins and each comprise, in addition to the blocking portion 142, also a release portion 146 and a transition portion 148.

The blocking portion 142 is cylindrical with a first diameter, and the release portion 146 is cylindrical with a second diameter. The transition portion 148 from the blocking portion 142 to the release portion 146 has a frustoconical shape.

The release portion 146 is arranged offset in the direction of the radial direction 134 relative to the blocking portion 142. If one of the coupling elements 138 moves from the release position into the blocking position 140, then it pushes its associated hub-side gear part 124 into the position in which it cannot come into contact with the wheel-carrier-side gear part 126.

The coupling elements 138 are each biased into the blocking position via springs 149. The coupling elements 138 can each be transferred into the release position by the application of pressure medium via a pressure medium channel 156.

As soon as the application of pressure medium via the pressure medium channel 156 is interrupted, the coupling elements 138 move back into the blocking position, since they are spring-biased.

The hub-side gear parts 124, or the compressor components 118, are thereby pushed radially outwards, namely into a position in which they lift off from the wheel-carrier-side gear part 126 located radially inwards. The compressor arrangement 10 is then in the freewheel position FL. This pushing of the hub-side gear part 124 radially outwards is made possible by the conically extending transition portion 148, and the transfer from the release position to the blocking position takes place smoothly and gradually.

Since the hub-side gear parts 124 are likewise biased, in the present case via springs, the springs 149 for biasing the coupling elements 138 must be stronger than the springs for biasing the hub-side gear parts 124. This biasing, in conjunction with the conical transition portion 148, allows the hub-side gear parts 124 to be pushed into the lifted position (FIG. 42).

Figure 44:
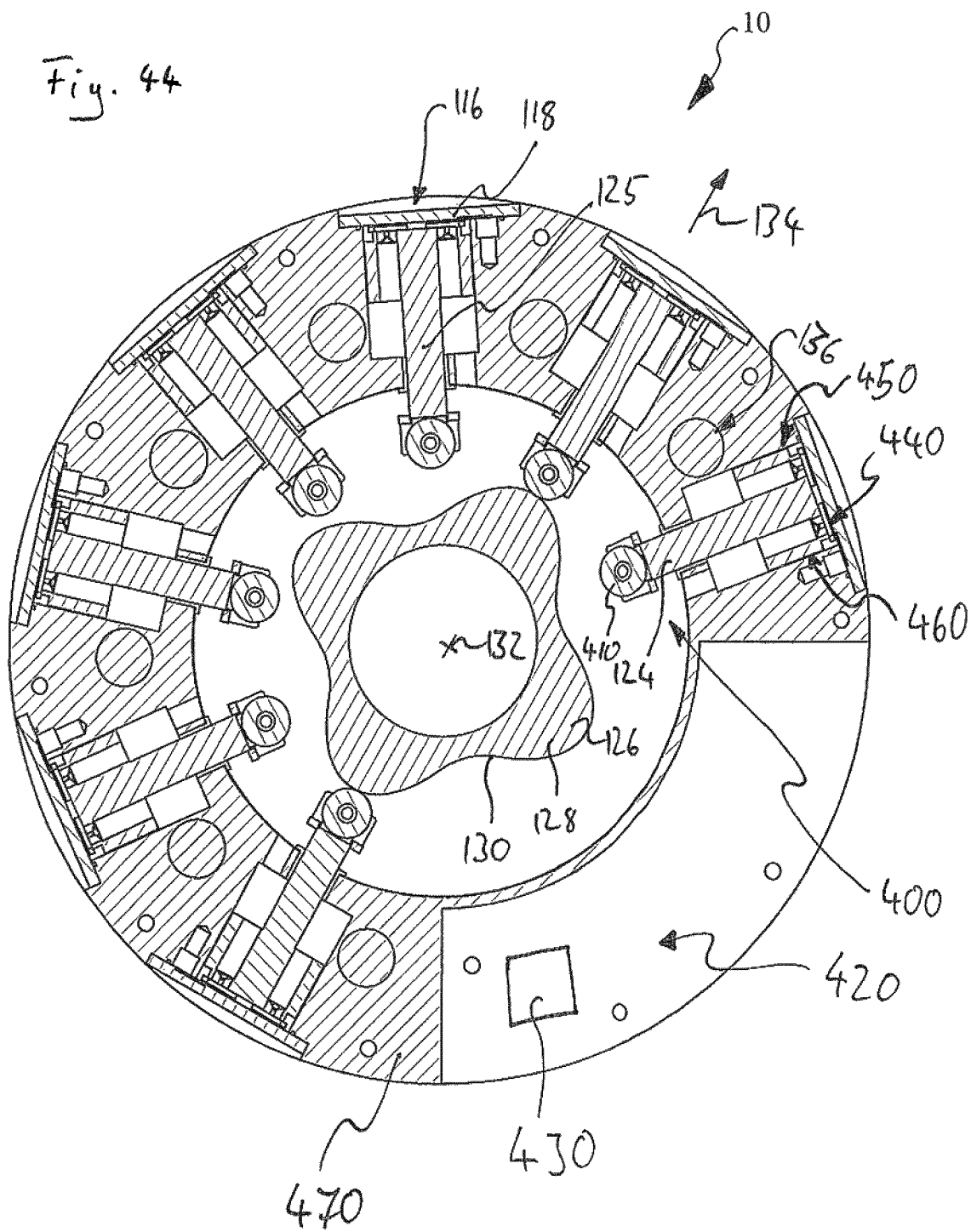
FIG. 44 shows an alternative compressor arrangement with a radially movable compressor component.

FIG. 44 shows a further embodiment of a mechanical compressor arrangement 10.

Similar to the embodiment of FIGS. 41 to 43 the compressor components 118 are configured to perform an oscillating translational movement in the radial direction. The representation is a sectional representation similar to FIGS. 42 and 43.

The hub-side gear parts 124 are thereby in the form of roller plungers 400. At their end facing the wheel-carrier-side gear part 126 they each have a self-lubricating roller 410.

Flutter valves 440 are arranged at each of the compressor components 18. Double seals 450 are also arranged at the compressor components 118, each of which delimits a lubricant reservoir 460 of the compressor component 118 and at the same time seals the compression chamber 116 with respect to the compressor component 118.

The compressor arrangement 10 also comprises a region 420 which serves to receive, for example, a control device, a filter, a coupling valve or a relief valve. The components just mentioned will be discussed in greater detail below in connection with FIGS. 48 and 49. In addition, an energy source 430 can also be arranged there, which can be in the form of, for example, an accumulator or also a pressure reservoir.

A hub-side part 470 of the compressor arrangement 10 is largely annular in shape and in the present case comprises all the parts of the compressor arrangement 10 shown in FIG. 44 apart from the wheel-carrier-side gear part 126.

Figure 45:
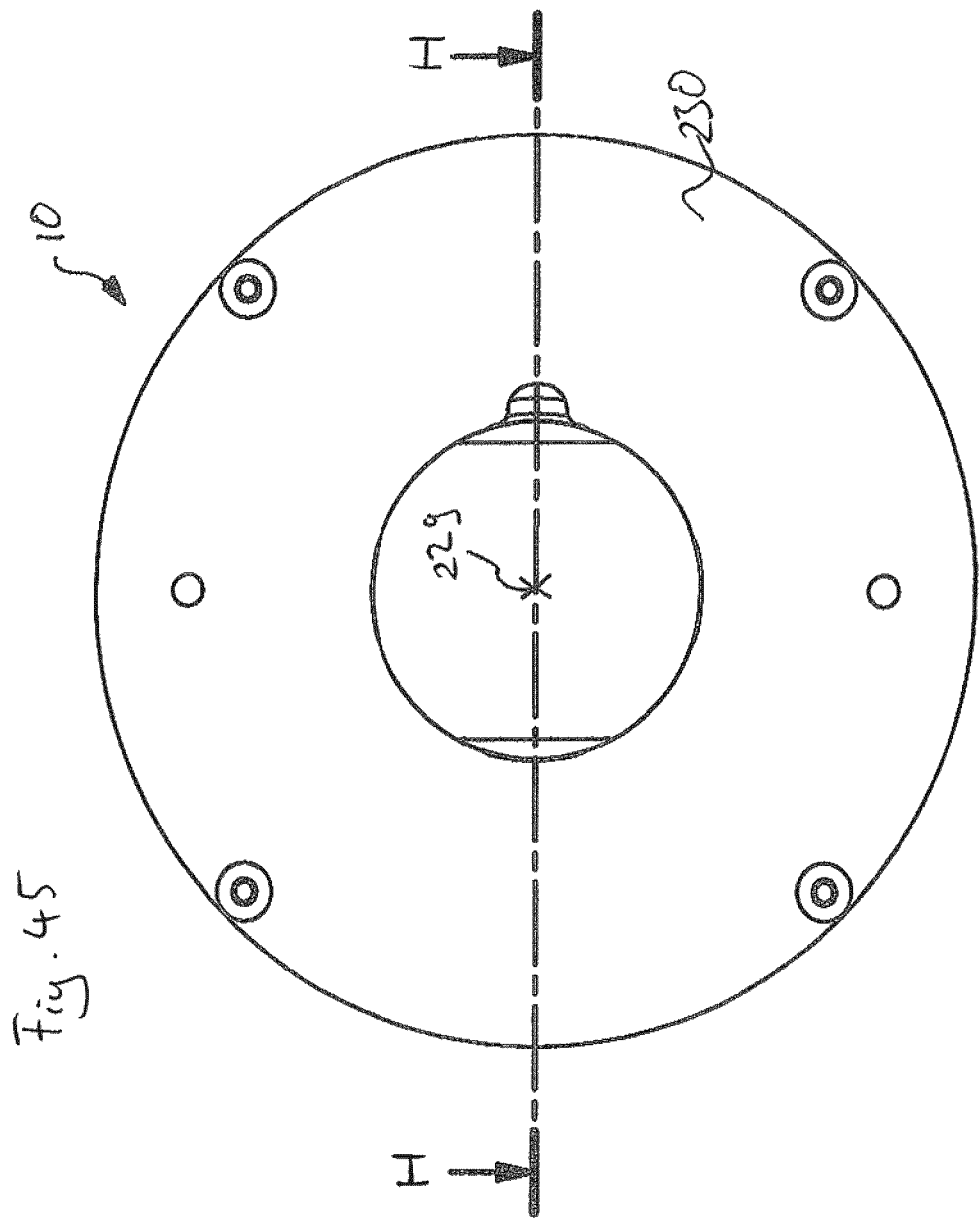
FIGS. 45 to 48 show a compressor arrangement with an axially movable compressor component.
Figure 46:
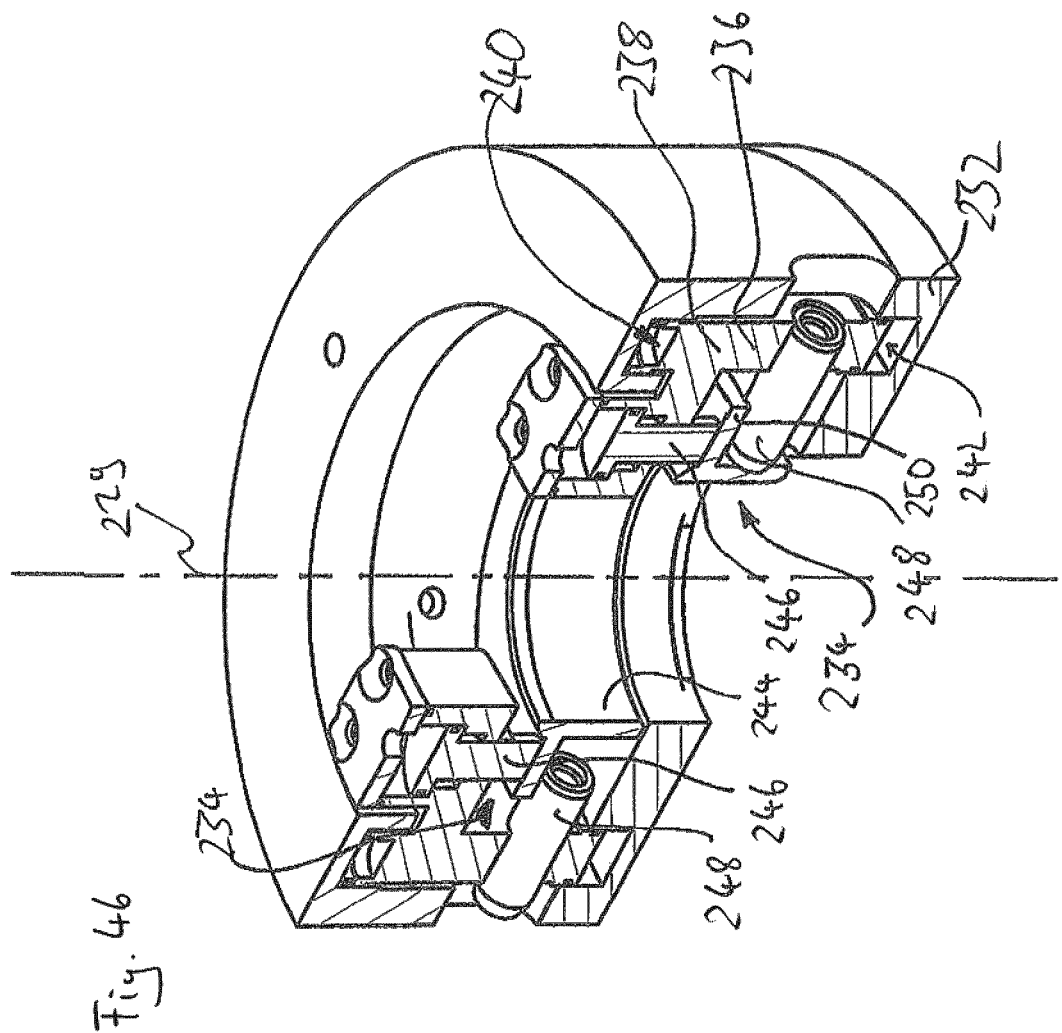
Figure 47:
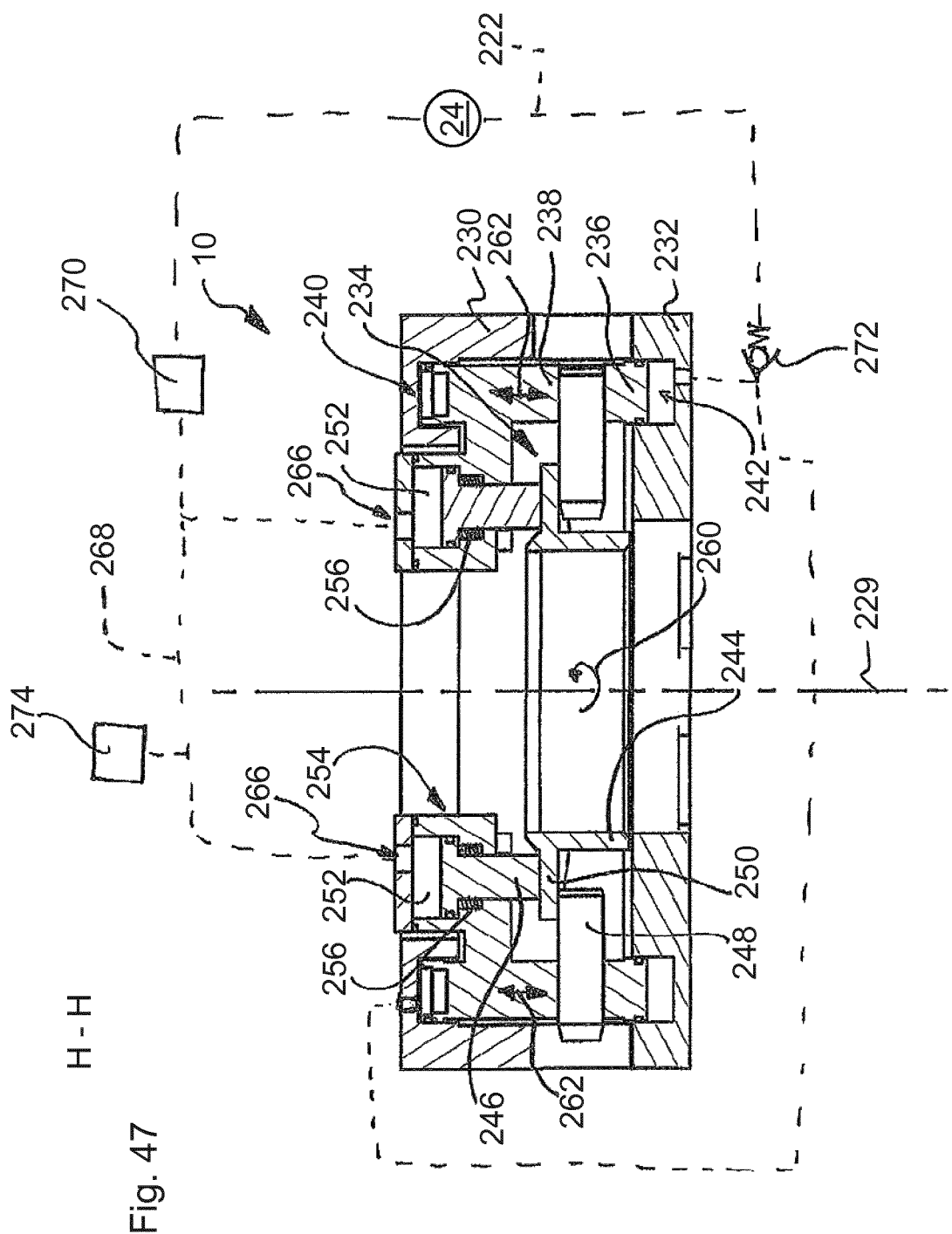

FIGS. 45 to 47 show a further possible form of the mechanical compressor arrangement 10. In FIG. 46, the compressor arrangement 10 is shown cut along line H-H.

The compressor arrangement comprises a first hub-side housing part 230 and a second hub-side housing part 232.

Hub-side gear parts have the reference numeral 234. Two of the hub-side gear parts 234 of the compressor arrangement 10 can be seen in FIG. 3.

Connected to the hub-side gear parts 234 is an annular piston 236, which constitutes a compressor component 238. The compressor component 238 in the form of the annular piston 236 delimits a first compression chamber 240 and a second compression chamber 242.

In the working operating state shown in FIGS. 3 and 4, the hub-side gear elements 234 are in engagement with a wheel-carrier-side gear part 244, in such a manner that they are able to cooperate therewith. The hub-side gear elements 234 form together with the wheel-carrier-side gear part 244 a cam gear 245, wherein the hub-side gear element 234 forms a plunger output.

The hub-side gear parts 234 each have a first actuatable contact element 246 and a second fixed contact element 248.

The contact elements 246, 248 of the hub-side gear parts 234 are in contact with a cylindrical barrel cam 250 of the wheel-carrier-side gear part 244, whereby the hub-side gear part 234 cooperates with the wheel-carrier-side gear part 244.

As already mentioned above, the first contact elements 246 are actuatable. This can clearly be seen in FIG. 47. The first contact elements, together with a pressure chamber 252 associated therewith, represent a coupling device 254.

By actuating the coupling device 254, the hub-side gear parts 234 can be brought into cooperation with the wheel-carrier-side gear part 244. By interrupting the actuation of the coupling device 254, cooperation of the hub-side gear parts 234 with the wheel-carrier-side gear part 244 can be prevented.

In each of FIGS. 46 and 47, the coupling device 254 is shown in the actuated or coupled state. The compressor arrangement 10 is thus in a working operating state.

Figure 48:
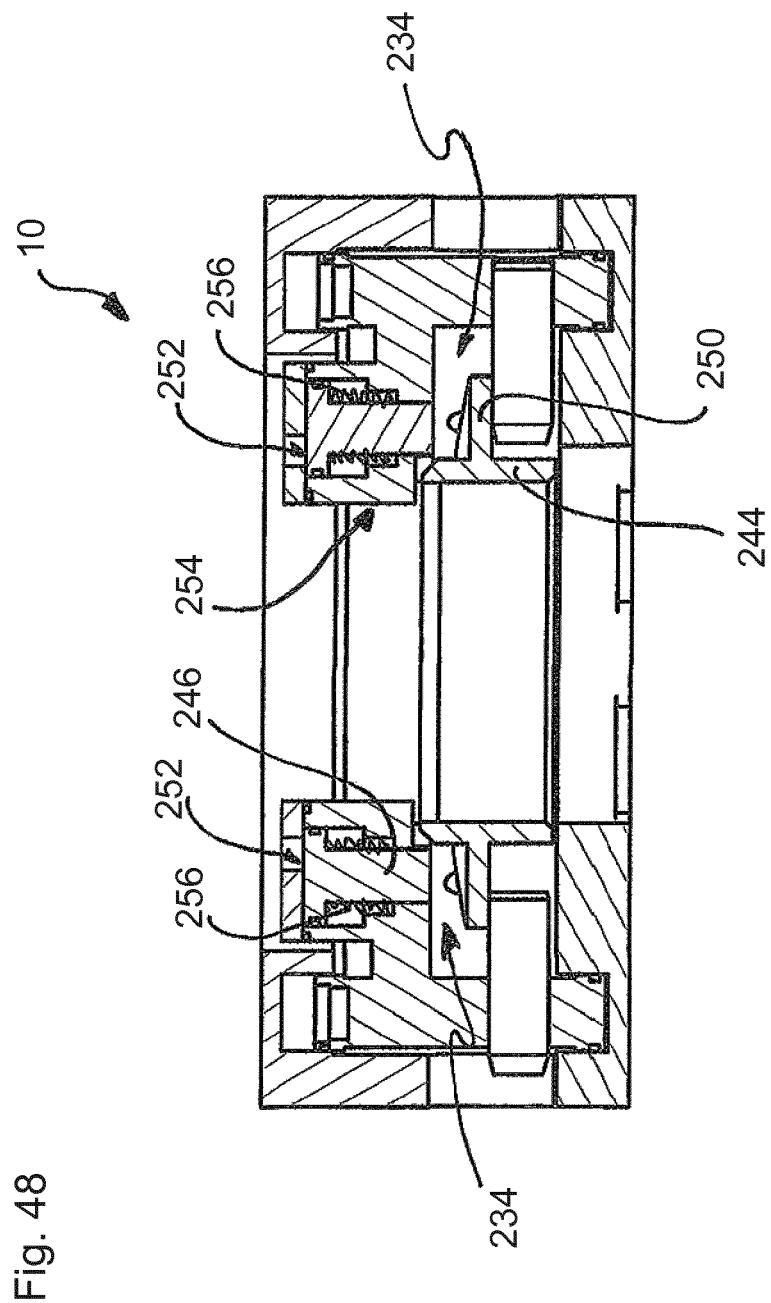

In FIG. 48, the coupling device 254 is shown in an unactuated or uncoupled state. The compressor arrangement 10 is thus in a freewheel operating state.

In this freewheel operating state, the first actuatable contact elements 246 are not in contact with the cylindrical barrel cam 250 of the wheel-carrier-side gear part 244. The hub-side gear parts 234 are thus prevented from cooperating with the wheel-carrier-side gear part 244.

In order to transfer the compressor arrangement 10 from the freewheel operating state shown in FIG. 48 into the working operating state, pressure medium is applied to the pressure chambers 252.

The first, actuatable contact elements 246 are in the form of pistons and, as a result of the application of pressure medium, move in the direction of the cylindrical barrel disc 250 and come into contact therewith. This state is shown in FIGS. 46 and 47.

The first, actuatable contact elements 246 are biased via pressure springs 256 in such a manner that they transfer the compressor arrangement 10 into a freewheel operating state when pressure medium is not applied to the pressure chambers 252. The coupling device 254 is thus biased into an unactuated position.

When the vehicle is moving, a rotational relative movement of the wheel-carrier-side gear part 244 relative to the hub-side gear part 234 about the rotational axis 229 takes place.

This is illustrated by the bent arrow with reference numeral 260 in FIG. 47.

In the working operating state of the compressor arrangement 10, the annular piston 236, or the compressor component 238 formed thereby, is moved up and down along the axis of rotation 229 by the cooperation of the wheel-carrier-side gear part 244 with the hub-carrier-side gear parts 234, which is indicated by the double-headed arrows with reference numeral 262. As a result of the oscillating translational movement of the annular piston 236, pressure medium is fed from the annular compression chambers 240 and 242 with each up and down movement.

Figure 49:
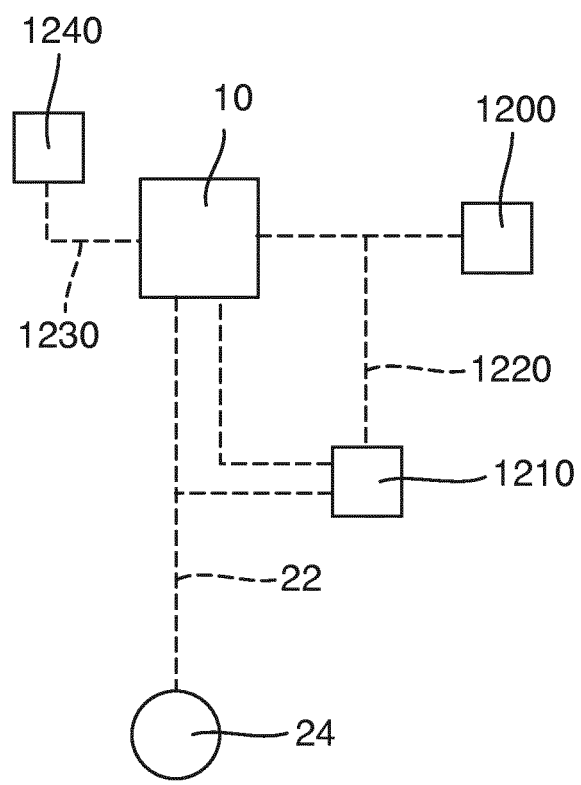
FIG. 49 shows a schematic set-up.

The control of the compressor arrangement 10 is explained schematically with reference to FIG. 49.

The inlets 266 of the pressure chambers 252 are each connected to the tire cavity 24 via a portion 268 of a pressure medium line 222 via a valve 270, which forms a coupling valve. The coupling valve 270 is so configured that it opens when the pressure in the tire falls below a pressure threshold value.

Pressure medium from the tire cavity 24 is then applied to the pressure chambers 252. The first actuatable contact elements 246 are then moved against the biasing of the springs 256 in the direction of the cylindrical barrel cam 250 and come into contact therewith.

The oscillating translational movement of the compressor component 238, or of the annular piston 236, is thus generated by the rotational relative movement between the wheel-carrier-side gear part 244 and the hub-side gear part 234 and the cooperation of the two gear parts. The oscillating translational movement of the compressor component 238 alternately reduces the volumes of the compression chambers 240 and 242, whereby pressure medium is conveyed from those chambers to the tire cavity 24.

The pressure chambers 240 and 242 are connected to the tire cavity 24 via a check valve 272. The check valve 272 opens towards the tire cavity 24.

If the pressure of the pressure medium in the tire cavity 24 reaches a desired value or exceeds it, then the coupling valve 270 closes and air is removed from the line portion 268 between the coupling valve 270 and the pressure chambers 252 via a relief valve 274. The actuatable contact elements 246, because of their biasing, thus move away from the cylindrical barrel cam 250 into the position shown in FIG. 48.

Figure 50:
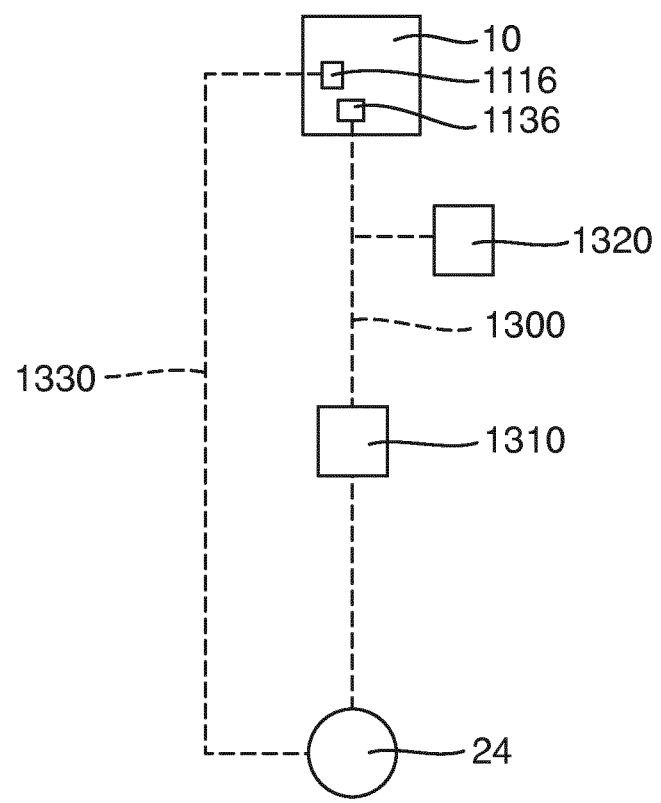
FIG. 50 shows a further schematic set-up.

A connection of the compressor arrangement 10 with further components will be explained hereinbelow (FIG. 49), and a general control of the compressor arrangement 10 will also be described (FIG. 50). These descriptions can be combined with any types of designs for the compressor arrangement 10.

As shown in FIG. 49, the compressor arrangement 10 can generally be connected to a filter 1200 and a control device 1210. The filter 1200 is preferably so arranged that it is fluidically arranged before the pressure medium inlets, or air inlets, of the compressor arrangement 10.

Via a measuring connection 1220, the control device 1210 is able to detect if the filter 1200 is blocked. If the control device 1210 detects that the filter 1200 is blocked, the filter can be cleaned by applying pressure medium, or air, thereto in the reverse flow direction. In the usual operating mode of the compressor arrangement 10, air is conveyed via the filter 1200 in the direction of the compressor arrangement 10 and, from there, to the tire cavity 24. In a cleaning operation, either pressure medium, or air, is let out of the tire cavity 24 and conveyed in the reverse flow direction through the filter 1200, or the compressor arrangement 10 starts to operate and conveys pressure medium, instead of to the tire cavity 24, in the reverse flow direction to the filter 1200. For this purpose, the compressor arrangement 10 draws in pressure medium via an additional inlet 1230, which has a further air filter 1240 which can be cleaned in the same way.

Advantageously, the control device 1210 can serve to measure and/or display the pressure, temperature and/or moisture of the pressure medium in the tire cavity 24, these functions being independent of the further functions of the control device 1210.

FIG. 50 shows an example of a variant of the control of the coupling device 1136. Actuation of the coupling device 1136 can, however, also take place electrically, electromagnetically or electromechanically. For this purpose, electrical energy from the main battery 3 of the vehicle 1, or from a generator provided there or another energy source, can be guided via sliding contacts to the hub side.

However, it is also conceivable to arrange a generator on the hub side, which generator obtains electrical energy from the rotational relative movement between the hub side and the wheel carrier side. It is also conceivable to arrange accumulators on the hub side, in particular in the spokes of the wheel rim 12.

The compressor arrangement 10, in particular the coupling device 1136 thereof, is connected to the tire cavity 24 via a coupling pressure medium line 1300. A coupling valve 1310 is arranged in the coupling pressure medium line 1300. In addition, a relief valve 1320 is provided in the coupling pressure medium line 1300. The compression chambers 1116 of the compressor arrangement 10 are connected to the tire cavity 24 via a pressure medium line 1330 provided for conveying.

At the coupling valve 1310, the pressure medium of the tire cavity 24 is below the pressure prevailing in the tire. If the pressure falls below a tire pressure threshold value, the coupling valve 1310 opens, whereby the coupling device 1136 is actuated by means of pressure medium from the tire cavity 24 and the hub-side gear part 124, 234 is brought into cooperation with the wheel-carrier-side gear part 126, 244.

If the vehicle 1 is moving, a rotational relative movement thus takes place between the hub side and the wheel carrier side, and pressure medium is thus conveyed from the compression chambers 1116 to the tire cavity 24 via the pressure medium line 1330 provided for conveying.

The coupling pressure medium line 1300 and the pressure medium line 1330 provided for conveying can also be formed together as a single line.

If a tire pressure desired value, which is preferably above the tire pressure threshold value, is exceeded, the coupling valve 1310 closes, whereby the application of pressure medium to the coupling device 1136 is interrupted. Preferably, air is removed from the coupling device 1136 via the coupling valve 1310 or the relief valve 1320 when the tire pressure desired value is exceeded. It is thus ensured that the compressor arrangement 10 stops operating immediately as soon as a pressure medium desired value in the tire cavity 24 is reached.

This mode of operation of the coupling device 1136 can be combined with all the embodiments and individual aspects of these embodiments of the compressor arrangement 10 of this application.

Figure 51:
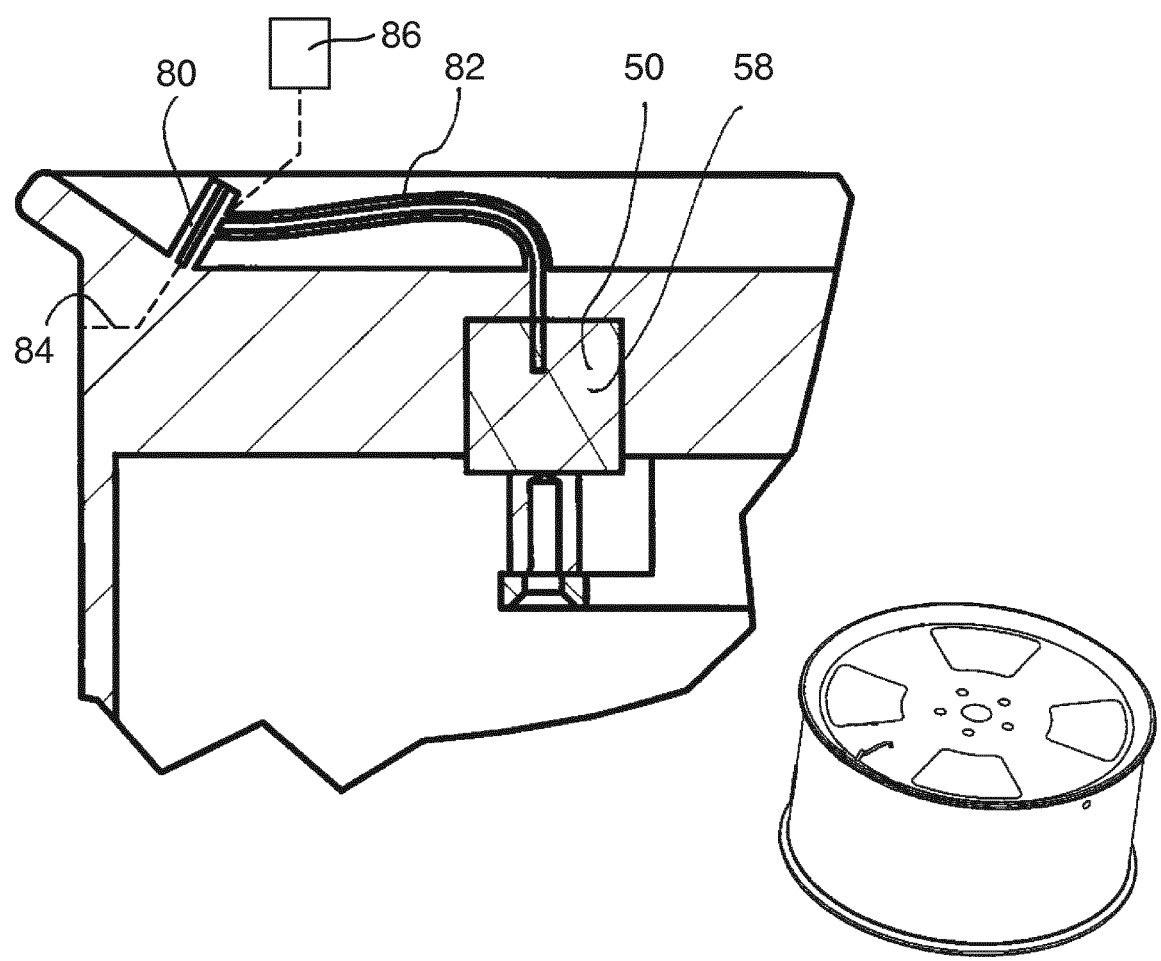
FIG. 51 shows a detailed representation of a pressure medium guide.

FIG. 51 shows a possibility for providing pressure medium for actuating the cover element 44. The tire cavity can be filled with pressure medium via a valve 80. From the valve 80, a branch 82 leads to the actuator 50. A further branch 84 leads to the tire cavity 24. If a pressure medium source is connected to the valve 80, then the tire cavity 24 can be filled with pressure medium via the further branch 84. The pressure medium is present in the branch 82 with the pressure prevailing in the tire cavity and is switchable via the switching units 58.

The valve 80 can also comprise a control unit 86, with which the pressure medium can be so switched that cover elements 44 either open or close.

As shown in FIG. 52, the actuating device 46 of a vehicle wheel 2 according to the invention can have two types of actuators 50a, 50b. The actuators 50a of the first type lead to opening of the cover elements 44 when pressure medium is applied, and the actuators 50b of the second type lead to closing of the cover element 44 when pressure medium is applied.

The provision of actuators 50 of different types (50a, 50b) in that manner can be combined with all the types of vehicle wheels described in this application. For this purpose, a central switching unit, for example, can apply pressure medium to different pressure medium lines according to which type of actuator is to be controlled.

The invention claimed is:

1. A vehicle wheel having a wheel rim which has a hub portion, a rim base for receiving a tire, a plurality of support portions arranged between the hub portion and the rim base, at least one interspace arranged between the support portions, and at least one cover element associated with the interspace, wherein the at least one cover element can be transferred from a first position, in which the at least one cover element at least partly covers the interspace, into a second position by pneumatic actuation and
wherein an actuating device for pneumatically actuating the at least one cover element is configured to be subjected to a pressure medium from a tire cavity of the vehicle wheel such that the pressure medium actuates the actuating device.

2. The vehicle wheel as claimed in claim 1, wherein in the first position, the at least one cover element closes the interspace and in the second position, the at least one cover element at least partly opens the interspace.

3. The vehicle wheel as claimed in claim 1, wherein a pressure medium channel extends from the tire cavity to the actuating device of the cover element.

4. The vehicle wheel as claimed in claim 3, wherein the vehicle wheel comprises a compressor arrangement for providing pressurized pressure medium.

5. The vehicle wheel as claimed in claim 4, wherein the compressor arrangement comprises at least one hub-side compression chamber.

6. The vehicle wheel as claimed in claim 4, wherein the compressor arrangement comprises a compressor component and the pressure medium can be pressurized by a movement of the compressor component.

7. The vehicle wheel as claimed in claim 6, wherein the vehicle wheel can be mounted on a wheel carrier to be rotatable about an axis of rotation, and the compressor arrangement comprises a gear which is adapted to convert a rotational movement between a wheel carrier side and a wheel hub side into a movement of the compressor component, by cooperation of a wheel-carrier-side gear part with a hub-side gear part.

8. The vehicle wheel as claimed in claim 7, wherein the compressor arrangement is electrically driven.

9. The vehicle wheel as claimed in claim 8, wherein the vehicle wheel comprises an energy transmission device, via which electrical energy for operating the compressor arrangement can be transmitted from a wheel-carrier-side energy source to the compressor arrangement.

10. The vehicle wheel as claimed in claim 8, wherein the vehicle wheel comprises a hub-side energy source for providing electrical energy for operating the compressor arrangement.

11. The vehicle wheel as claimed in claim 10, wherein the hub-side energy source comprises an energy producer by means of which the rotational movement between the wheel carrier side and the wheel hub side can be converted into electrical energy.

12. The vehicle wheel as claimed in claim 1, wherein cover element covers the interspace further in the first position of the cover element than in the second position of the cover element.

13. The vehicle wheel as claimed in claim 1, wherein the cover element is biased into one of the first position or the second position.

14. The vehicle wheel as claimed in claim 1, wherein the cover element is movable between the first position and the second position by a rotational movement relative to the support portions.

15. The vehicle wheel as claimed in claim 1, wherein the cover element is movable between the first position and the second position by a translational movement in the direction of the axis of rotation relative to the support portions.

16. The vehicle wheel as claimed in claim 1, wherein the cover element is movable between the first position and the second position by a tilting movement relative to the support portions.

17. The vehicle wheel as claimed in claim 1, wherein the vehicle wheel has a plurality of interspaces, each of which has an associated cover element which can be transferred from a first position into a second position by pneumatic actuation.

18. The vehicle wheel as claimed in claim 1, wherein the vehicle wheel has a coupling device via which the cover element can be coupled with a brake of a vehicle on which the vehicle wheel is arranged, wherein the coupling device is configured to control an actuating device of the cover element in such a manner that the cover element is transferred from the first position into the second position in dependence on the actuation of the brake and/or if a temperature threshold in the region of the brake is exceeded.

19. The vehicle wheel as claimed in claim 1, wherein the cover element can be transferred between the first position and the second position via intermediate positions.

20. The vehicle wheel as claimed in claim 1, wherein the cover element in the second position is so arranged relative to the support element that the cover element guides air to a brake system during operation of the vehicle wheel by the rotation of the vehicle wheel.

21. The vehicle wheel as claimed in claim 1, wherein the vehicle wheel comprises a dust collecting device which is configured to collect dust particles from air present in an interior of the wheel rim.

22. The vehicle wheel as claimed in claim 21, wherein the dust collecting device comprises an air filter and/or a magnetic dust collector.

23. A vehicle having a vehicle wheel as claimed in claim 1, wherein a position of the cover element between the first position and the second position can be set by a switching unit.

* * * * *